(12) United States Patent
Toba

(10) Patent No.: US 10,440,424 B2
(45) Date of Patent: Oct. 8, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/517,950

(22) PCT Filed: Oct. 13, 2015

(86) PCT No.: PCT/JP2015/078878
§ 371 (c)(1),
(2) Date: Apr. 7, 2017

(87) PCT Pub. No.: WO2016/060104
PCT Pub. Date: Apr. 21, 2016

(65) Prior Publication Data
US 2017/0311030 A1 Oct. 26, 2017

(30) Foreign Application Priority Data
Oct. 17, 2014 (JP) .................. 2014-213096

(51) Int. Cl.
*H04N 7/18* (2006.01)
*H04N 21/436* (2011.01)
(Continued)

(52) U.S. Cl.
CPC ......... *H04N 21/436* (2013.01); *H04B 10/114* (2013.01); *H04L 25/02* (2013.01);
(Continued)

(58) Field of Classification Search
CPC .......... H04N 21/43635; H04N 21/236; H04N 13/194; H04N 19/00; H04L 25/0272; H04L 25/14; H04L 7/0091
See application file for complete search history.

(56) References Cited

U.S. PATENT DOCUMENTS

| | | | |
|---|---|---|---|
| 2004/0202118 A1* | 10/2004 | Yagawa | H04W 88/085 370/320 |
| 2006/0077778 A1* | 4/2006 | Tatum | G02B 6/4246 369/44.11 |

(Continued)

FOREIGN PATENT DOCUMENTS

| | | |
|---|---|---|
| JP | 2002-359613 A | 12/2002 |
| JP | 2003-524914 A | 8/2003 |

(Continued)

OTHER PUBLICATIONS

Office Action for JP Patent Application No. 2016-554077, dated Jul. 9, 2019, 07 pages of Office Action and 05 pages of English Translation.

*Primary Examiner* — Jason P Salce
(74) *Attorney, Agent, or Firm* — Chip Law Group

(57) ABSTRACT

Connection with an apparatus with a lower standard is easily performed. A digital signal to which coding has been performed is transmitted to an external device by a differential signal through a plurality of channels via a transmission path. In this case, a digital signal to which first coding has been performed and from which clock extraction is not available is transmitted through a part of the plurality of channels, and a digital signal to which second coding has been performed and from which clock extraction is available is transmitted through the other channels of the plurality of channels. A reception side processes the digital signal (Continued)

received through the plurality of channels on the basis of the clock extracted from the digital signal received through any one of other channels.

18 Claims, 16 Drawing Sheets

(51) Int. Cl.
    *H04L 25/02* (2006.01)
    *H04L 25/49* (2006.01)
    *H04L 29/04* (2006.01)
    *H04N 19/103* (2014.01)
    *H04B 10/114* (2013.01)
    *H04L 27/18* (2006.01)
    *H04N 5/445* (2011.01)
    *H04N 21/442* (2011.01)
    *H04N 5/38* (2006.01)
    *H04N 5/765* (2006.01)
    *H04N 7/06* (2006.01)

(52) U.S. Cl.
    CPC ............... *H04L 25/49* (2013.01); *H04L 27/18* (2013.01); *H04L 29/04* (2013.01); *H04N 5/38* (2013.01); *H04N 5/445* (2013.01); *H04N 5/765* (2013.01); *H04N 7/06* (2013.01); *H04N 19/103* (2014.11); *H04N 21/442* (2013.01); *H04L 25/0272* (2013.01)

(56) References Cited

U.S. PATENT DOCUMENTS

| | | | |
|---|---|---|---|
| 2008/0007616 A1* | 1/2008 | Baladhandayuthapani | ................. G06F 3/14 348/14.12 |
| 2010/0115295 A1* | 5/2010 | Diab | ........................ H04L 12/12 713/300 |
| 2011/0081807 A1* | 4/2011 | Rephaeli | ............... G02B 6/4201 439/620.21 |
| 2012/0249871 A1* | 10/2012 | Nguyen | ................. H04B 10/40 348/441 |
| 2012/0300084 A1* | 11/2012 | Oh | ........................ H04N 5/775 348/181 |
| 2015/0181157 A1* | 6/2015 | Kuo | ......................... H04N 7/01 348/441 |

FOREIGN PATENT DOCUMENTS

| | | |
|---|---|---|
| JP | 2011-192042 A | 9/2011 |
| JP | 2012-075067 A | 4/2012 |
| JP | 2013-042195 A | 2/2013 |

\* cited by examiner

FIG. 8 (b)
NEW HDMI PIN ASSIGNMENT

| PIN | Signal Assignment |
|---|---|
| 1 | TMDS Data2+ |
| 2 | TMDS Data5+ |
| 3 | TMDS Data2- |
| 4 | TMDS Data1+ |
| 5 | TMDS Data5- |
| 6 | TMDS Data1- |
| 7 | TMDS Data0+ |
| 8 | TMDS Data4+ |
| 9 | TMDS Data0- |
| 10 | TMDS Data3+ |
| 11 | TMDS Data4- |
| 12 | TMDS Data3- |
| 13 | CEC |
| 14 | Utility/HEAC+ |
| 15 | SCL |
| 16 | SDA |
| 17 | DDC/CEC Ground/HEAC Shield |
| 18 | +5V Power |
| 19 | Hot Plug Detect/HEAC- |

FIG. 8 (a)
CURRENT HDMI PIN ASSIGNMENT
(Type-A)

| PIN | Signal Assignment |
|---|---|
| 1 | TMDS Data2+ |
| 2 | TMDS Data2 Shield |
| 3 | TMDS Data2- |
| 4 | TMDS Data1+ |
| 5 | TMDS Data1 Shield |
| 6 | TMDS Data1- |
| 7 | TMDS Data0+ |
| 8 | TMDS Data0 Shield |
| 9 | TMDS Data0- |
| 10 | TMDS Clock+ |
| 11 | TMDS Clock Shield |
| 12 | TMDS Clock- |
| 13 | CEC |
| 14 | Utility/HEAC+ |
| 15 | SCL |
| 16 | SDA |
| 17 | DDC/CEC Ground/HEAC Shield |
| 18 | +5V Power |
| 19 | Hot Plug Detect/HEAC- |

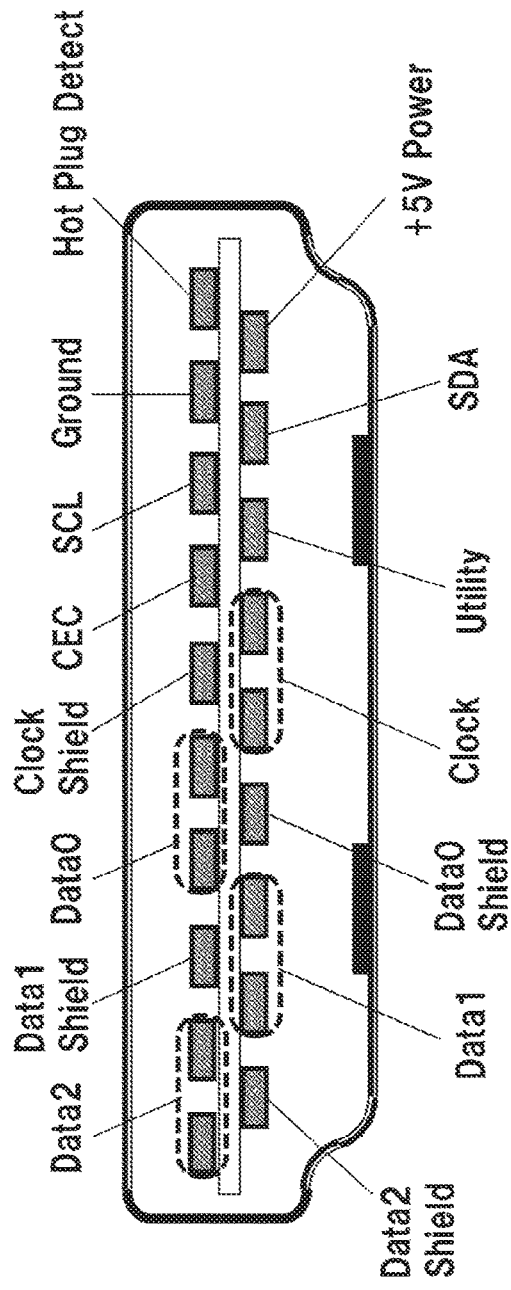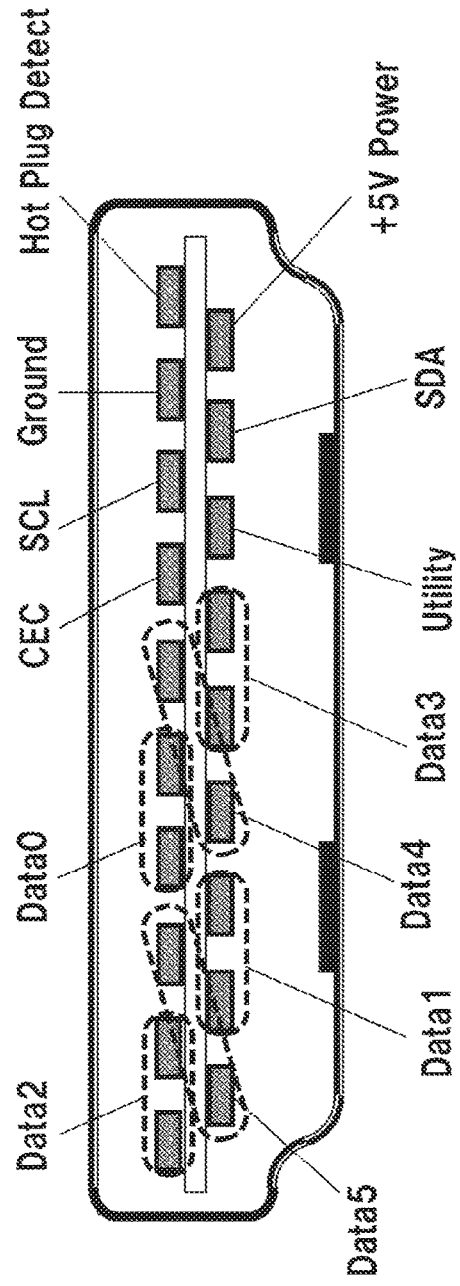
FIG. 9 (a)  FIG. 9 (b)

SHIELDED TWISTED PAIR PART

EXEMPLARY STRUCTURE OF CURRENT HDMI CABLE

FIG. 15

EXAMPLE OF EDID

| Byte # | 7 | 6 | 5 | 4 | 3 | 2 | 1 | 0 |
|---|---|---|---|---|---|---|---|---|
| | Rsvd (0) | Rsvd (0) | Rsvd (0) | Rsvd (0) | Rsvd (0) | New Rx Sink | New Cable | Rsvd (0) |

EXAMPLE OF NEW HDMI CABLE

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2015/078878 filed on Oct. 13, 2015, which claims priority benefit of Japanese Patent Application No. JP 2014-213096 filed in the Japan Patent Office on Oct. 17, 2014. Each of the above-referenced applications is hereby incorporated herein by reference in its entirety.

TECHNICAL FIELD

The present invention relates to a transmission apparatus, a transmission method, a reception apparatus, and a reception method, and specifically, relates to a transmission apparatus which transmits a digital signal such as a video by a differential signal via a transmission path.

BACKGROUND ART

In recent years, a high definition multimedia interface (HDMI) has been widely used as a digital interface for connecting consumer electronics (CE) devices, and the HDMI has been the de facto standard in the field. In the HDMI standard, signals of a video, audio, and control are transmitted as digital signals by using three data differential line pairs (TMDS Channel 0/1/2). Note that the "HDMI" is the registered trademark.

Now, the maximum value determined in the HDMI standard as a transmission speed of the digital signal is 10.2 Gbps. In consideration of the adoption to a video signal of a 4k2k (QFHD) and a video signal with contents having a higher image quality, the above value of the HDMI is required to be extended to the highest value such as 15 Gbps and 20 Gbps in the current standard in the future.

To speed-up the HDMI, it is considered to increase the number of the data differential line pairs from three for now to four or more. The applicant has proposed a technology for increasing the number of the data differential line pairs to six (Patent Document 1).

CITATION LIST

Patent Document

Patent Document 1: Japanese Patent Application Laid-Open No. 2012-75067

SUMMARY OF THE INVENTION

Problems to be Solved by the Invention

A purpose of the present technology is to easily perform connection with an apparatus with a lower standard.

Solutions to Problems

A concept of the present technology is a transmission apparatus including a digital signal transmission unit which transmits a digital signal to which coding has been performed to an external device by a differential signal through a plurality of channels via a transmission path. In the transmission apparatus, the digital signal transmission unit transmits a digital signal to which first coding has been performed and from which clock extraction is not available through a part of the plurality of channels and transmits a digital signal to which second coding has been performed and from which clock extraction is available through the other channels of the plurality of channels.

In the present technology, the digital signal transmission unit transmits the digital signal to which coding has been performed to the external device by the differential signal through the plurality of channels via the transmission path. Here, the digital signal to which the first coding has been performed and from which clock extraction is not available is transmitted through a part of the plurality of channels, and the digital signal to which the second coding has been performed and from which clock extraction is available is transmitted through the other channels of the plurality of channels.

For example, the first coding may be TMDS coding. Also, for example, both the first coding and the second coding may be 8 bit/10 bit conversion coding. Also, for example, the transmission path may be an HDMI cable, the number of a part of the channels may be three, and the number of other channels may be three.

In this way, according to the present technology, the digital signal to which the first coding has been performed and from which the clock extraction is not available is transmitted through a part of the plurality of channels, and the digital signal to which the second coding has been performed and from which clock extraction is available is transmitted through the other channels of the plurality of channels. Therefore, connection with an apparatus with a lower standard for using the digital signal to which the first coding has been performed can be easily performed. That is, even when the apparatus is configured to be connectable with the apparatus with a lower standard, it is not necessary to additionally perform the first coding.

Also, another concept of the present technology is a reception apparatus including a digital signal reception unit which receives a digital signal to which coding has been performed from an external device by a differential signal through a plurality of channels via a transmission path. In the reception apparatus, the digital signal reception unit receives a digital signal to which first coding has been performed and from which clock extraction is not available through a part of the plurality of channels and receives a digital signal to which second coding has been performed and from which clock extraction is available through other channels of the plurality of channels. The reception apparatus further includes a processing unit which processes the digital signal received through the plurality of channels on the basis of a clock extracted from the digital signal received through any one of the other channels.

According to the present technology, the digital signal reception unit receives the digital signal to which the coding has been performed from the external device by the differential signal through the plurality of channels via the transmission path. Here, the digital signal to which the first coding has been performed and from which clock extraction is not available is received through a part of the plurality of channels, and the digital signal to which the second coding has been performed and from which clock extraction is available is received through the other channels of the plurality of channels. The processing unit processes the digital signal received through the plurality of channels on the basis of the clock extracted from the digital signal received through any one of the other channels.

In this way, according to the present technology, the digital signal received through the plurality of channels is processed on the basis of the clock extracted from the digital signal received through any one of the other channels. Therefore, the digital signal received through a part of the plurality of channels can be excellently processed without receiving the clock.

Also, still another concept of the present technology is a transmission apparatus including a digital signal transmission unit which transmits a digital signal to which coding has been performed to an external device by a differential signal through a plurality of channels via a transmission path. In the transmission apparatus, the digital signal transmission unit transmits the digital signal by selecting one of a first mode and a second mode, and the first mode is a mode for transmitting a digital signal to which first coding has been performed and from which clock extraction is not available through a predetermined number of first channels and transmitting a digital signal to which second coding has been performed and from which clock extraction is available through a predetermined number of second channels, and the second mode is a mode for transmitting a digital signal to which the first coding has been performed through the predetermined number of first channels and transmitting a clock through a single third channel corresponding to any one of the predetermined number of second channels.

In the present technology, the digital signal transmission unit transmits the digital signal to which coding has been performed to the external device by the differential signal through the plurality of channels via the transmission path. Here, the digital signal transmission unit transmits the digital signal by selecting one of the first mode and the second mode.

In the first mode, the digital signal to which the first coding has been performed and from which the clock extraction is not available is transmitted through the predetermined number of first channels, and the digital signal to which the second coding has been performed and from which clock extraction is available is transmitted through the predetermined number of second channels. In the second mode, the digital signal to which the first coding has been performed is transmitted through the predetermined number of first channels, and the clock is transmitted through the single third channel corresponding to any one of the predetermined number of second channels.

For example, the first coding may be TMDS coding. Also, for example, both the first coding and the second coding may be 8 bit/10 bit conversion coding. Also, for example, the transmission path may be the HDMI cable. The number of the first channels may be three, and the number of the second channels may be three.

In this way, according to the present technology, the digital signal is transmitted by selecting one of the first mode and the second mode. Therefore, by selecting the first mode, a signal can be transmitted with a high data rate. By selecting the second mode, connection with the apparatus with a lower standard for using the digital signal to which the first coding has been performed can be performed.

Furthermore, in the present technology, for example, a mode determining unit which determines whether the external device and the transmission path are compliant with the first mode and a control unit which controls mode selection by the digital signal transmission unit on the basis of the determination by the mode determining unit may be further included. In this case, when the external device and the transmission path are compliant with the first mode, the transmission in the first mode is performed, and wrong signal transmission can be avoided.

Also, in the present technology, for example, the channels of the predetermined number of second channels other than the single channel corresponding to the third channel may be AC coupled with the transmission path. The AC coupled channel is advantageous to the high-speed operation, and an advantage over the other channel is secured.

Also, yet another concept of the present technology is a reception apparatus including a digital signal reception unit which receives a digital signal to which coding has been performed from an external device by a differential signal through a plurality of channels via a transmission path. In the reception apparatus, the digital signal reception unit receives the digital signal by selecting one of a first mode and a second mode. The first mode is a mode for receiving a digital signal to which first coding has been performed and from which clock extraction is not available through a predetermined of number of first channels and receiving a digital signal to which second coding has been performed and from which clock extraction is available through a predetermined number of second channels, and the second mode is a mode for receiving a digital signal to which the first coding has been performed through the predetermined number of first channels and receiving a clock through a single third channel corresponding to any one of the predetermined number of second channels. The reception apparatus further includes a processing unit which processes the digital signal received through the predetermined number of first channels and second channels on the basis of the clock extracted from the digital signal received through any one of the predetermined number of second channels in the first mode and processes the digital signal received through the predetermined number of first channels on the basis of the clock received through the third channel in the second mode.

According to the present technology, the digital signal reception unit receives the digital signal to which the coding has been performed from the external device by the differential signal through the plurality of channels via the transmission path. Here, the digital signal reception unit receives the digital signal by selecting one of the first mode and the second mode.

In the first mode, the digital signal to which the first coding has been performed and from which the clock extraction is not available is received through the predetermined number of first channels, and the digital signal to which the second coding has been performed and from which the clock extraction is available is received through the predetermined number of second channels. In the second mode, the digital signal to which the first coding has been performed is received through the predetermined number of first channels, and the clock is received through the single third channel corresponding to any one of the predetermined number of second channels.

The processing unit processes the digital signal received through the predetermined number of first channels and second channels on the basis of the clock extracted from the digital signal received through any one of the predetermined number of second channels in the first mode. Also, the processing unit processes the digital signal received through the predetermined number of first channels on the basis of the clock received through the third channel in the second mode.

For example, both the first coding and the second coding may be 8 bit/10 bit conversion coding. Also, for example, the transmission path may be the HDMI cable. The number of the first channels may be three, and the number of the second channels may be three.

In this way, according to the present technology, either one of the first mode and the second mode is selected, and the digital signal is received. Therefore, by selecting the first mode, a signal can be transmitted with a high data rate. By selecting the second mode, connection with the apparatus with a lower standard for using the digital signal to which the first coding has been performed can be performed.

Furthermore, in the present technology, for example, the channels of the predetermined number of second channels other than the single channel corresponding to the third channel may be AC coupled with the transmission path. The AC coupled channel is advantageous to the high-speed operation, and an advantage over the other channel is secured.

Also, in the present technology, for example, the control unit may be included which controls mode selection by the digital signal transmission unit on the basis of control information transmitted from the external device. In this case, since the mode which is compliant with the mode selection by the external device is selected, the digital signal transmitted from the external device can be appropriately received.

Effects of the Invention

According to the present technology, connection with an apparatus with a lower standard can be easily performed. The effects described herein are only exemplary and not limited to these. Also, there may be an additional effect.

BRIEF DESCRIPTION OF DRAWINGS

FIGS. 8(a) and 8(b) are diagrams indicating a comparison between pin assignments of the current HDMI (Type A) and the new HDMI.

FIGS. 9(a) and 9(b) are diagrams of pin arrangements of receptacles of the source devices and the sink devices of the current HDMI and the new HDMI.

FIG. 15 is a diagram of exemplary flag information newly defined in EDID.

MODE FOR CARRYING OUT THE INVENTION

A mode for carrying out the present invention (referred to as "embodiment") is described below. Note that the description is made in the following order.

1. Embodiment
2. Modification

<1. Embodiment>

[Exemplary Configuration of AV System]

Figure 1:
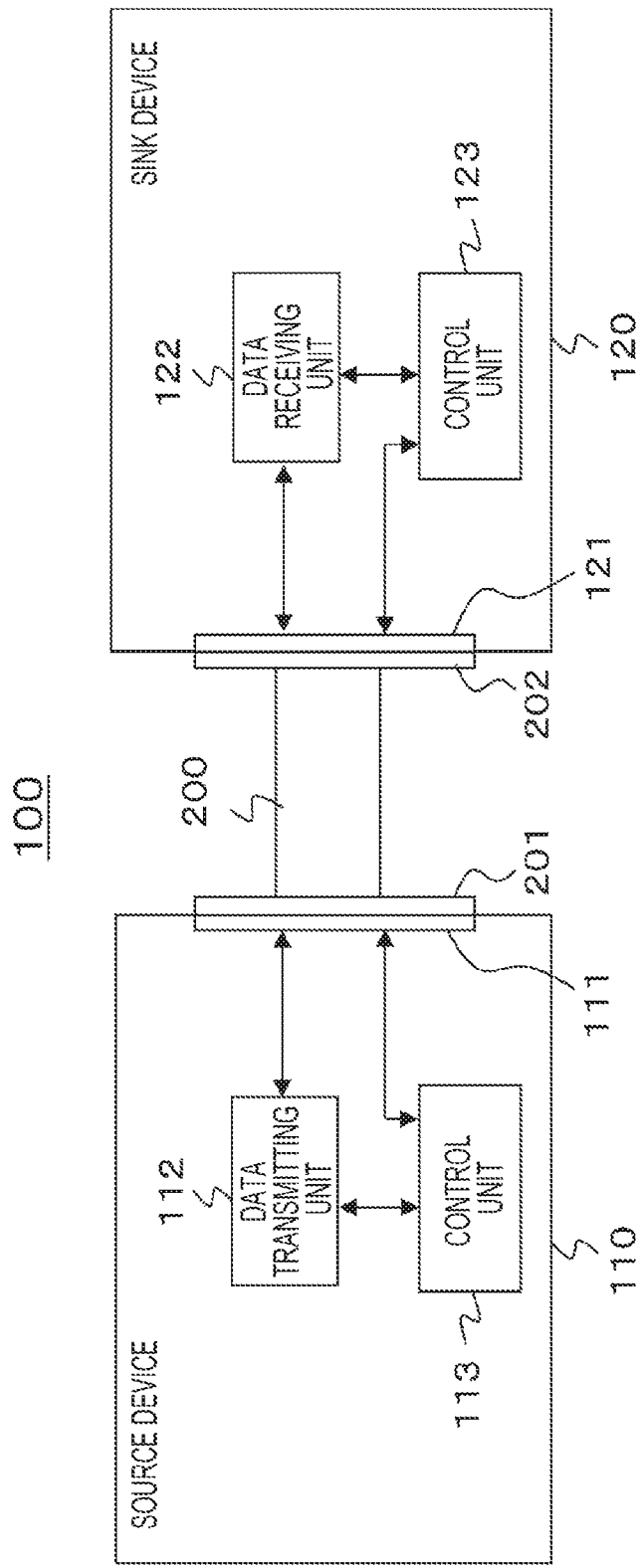
FIG. 1 is a block diagram of an exemplary configuration of an AV system according to an embodiment of the present invention.

FIG. 1 is a diagram of an exemplary configuration of an audio and visual (AV) system 100 according to an embodiment. The AV system 100 includes a source device 110 and a sink device 120 connected to each other. The source device 110 is an AV source such as a game machine, a disk player, a set top box, a digital camera, and a mobile phone. The sink device 120 is, for example, a television receiver and a projector.

The source device 110 is connected to the sink device 120 via a cable 200. The source device 110 includes a receptacle 111, to which a data transmitting unit 112 is connected, for configuring a connector. The sink device 120 includes a receptacle 121, to which a data receiving unit 122 is connected, for configuring a connector. Also, a plug 201 for configuring the connector is provided at one end of the cable 200, and a plug 202 for configuring the connector is provided at the other end. The plug 201 at one end of the cable 200 is connected to the receptacle 111 of the source device 110, and the plug 202 at the other end of the cable 200 is connected to the receptacle 121 of the sink device 120.

The source device 110 includes a control unit 113. The control unit 113 controls the entire source device 110. In the present embodiment, the data transmitting unit 112 of the source device 110 is compliant with both the current HDMI and the new HDMI. When it is determined that the cable 200 is compliant with the new HDMI and the sink device 120 is compliant with the new HDMI, the control unit 113 controls the data transmitting unit 112 to operate in an operation mode of the new HDMI. On the other hand, at least when it is determined that the sink device 120 is compliant with the current HDMI or that the cable 200 is compliant with the current HDMI, the control unit 113 controls the data transmitting unit 112 to operate in the operation mode of the current HDMI.

The sink device 120 includes a control unit 123. The control unit 123 controls the entire sink device 120. In the present embodiment, the data receiving unit 122 of the sink device 120 is compliant with the current HDMI or both the current HDMI and the new HDMI. When the data receiving unit 122 is compliant with both the current HDMI and the new HDMI, the control unit 123 controls the data receiving unit 122 to operate in the operation mode same as that of the data transmitting unit 112 of the source device 110. In this case, the control unit 123 controls the operation mode of the data receiving unit 122, for example, on the basis of a determination result on the operation mode transmitted through a line such as a CEC from the source device 110. The cable 200 is compliant with the current HDMI or the new HDMI.

Figure 2:
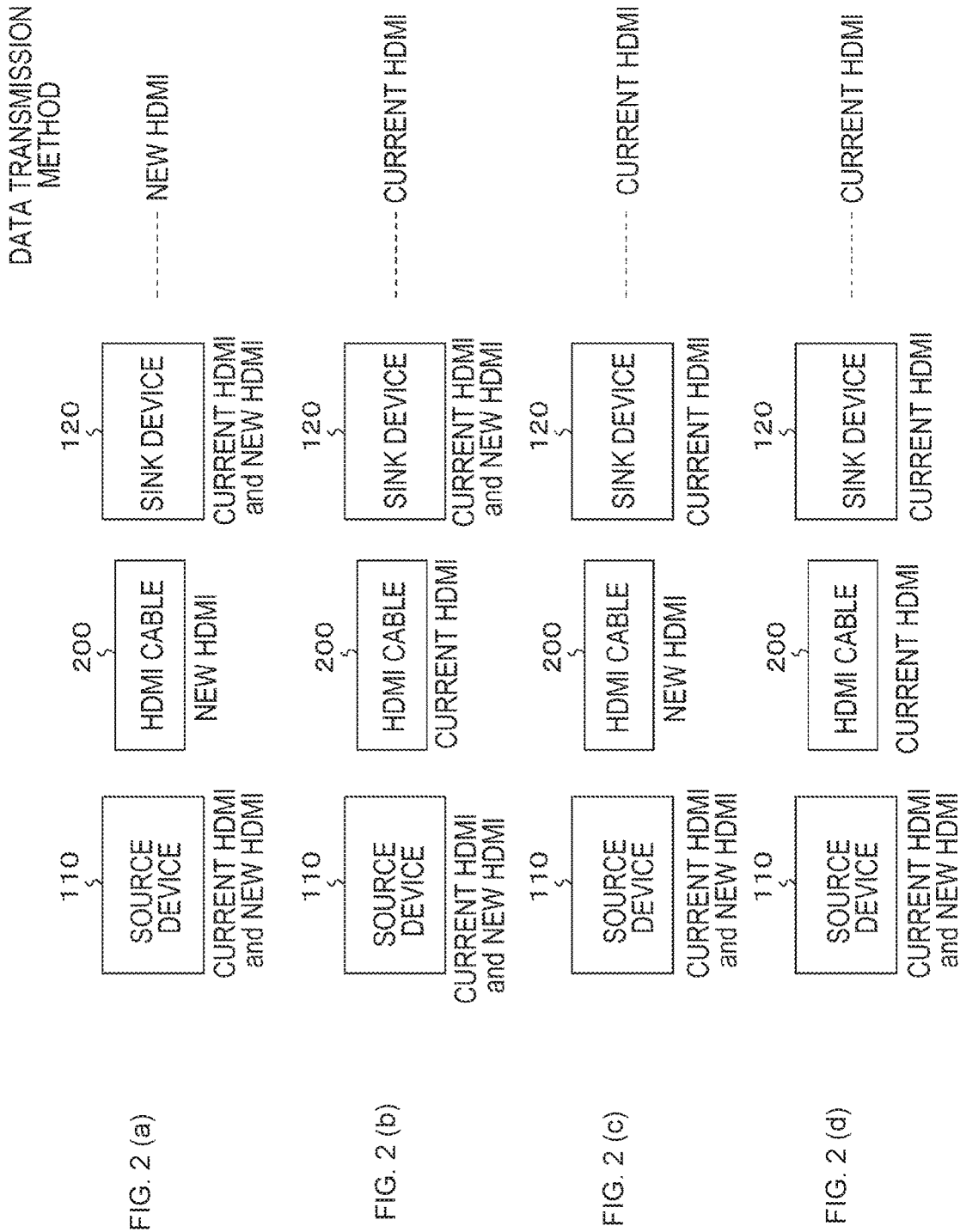
FIGS. 2(a) to 2(d) are diagrams of exemplary combinations of a source device, an HDMI cable, and a sink device.

In the AV system 100 illustrated in FIG. 1, when the cable 200 is compliant with the new HDMI and the sink device 120 is compliant with both the current HDMI and the new HDMI as illustrated in FIG. 2(*a*), data is transmitted with the new HDMI. At this time, the data transmitting unit 112 of the source device 110 and the data receiving unit 122 of the sink device 120 are controlled to operate in the operation mode of the new HDMI.

Also, in the AV system 100 illustrated in FIG. 1, at least when the cable 200 is compliant with the current HDMI or when the sink device 120 is compliant with the current HDMI as illustrated in FIGS. 2(*b*) to 2(*d*), data is transmitted with the current HDMI. At this time, the data transmitting unit 112 of the source device 110 is controlled to operate in the operation mode of the current HDMI. Also, the data receiving unit 122 of the sink device 120 which is compliant with both the current HDMI and the new HDMI is controlled to operate in the operation mode of the current HDMI.

Furthermore, in a case of FIG. 2(*b*), when the cable 200 can perform new HDMI data transmission by lowering a data transfer rate and the like, data may be transmitted in the new HDMI mode.

"Exemplary Configurations of Data Transmitting Unit and Data Receiving Unit"

Figure 3:
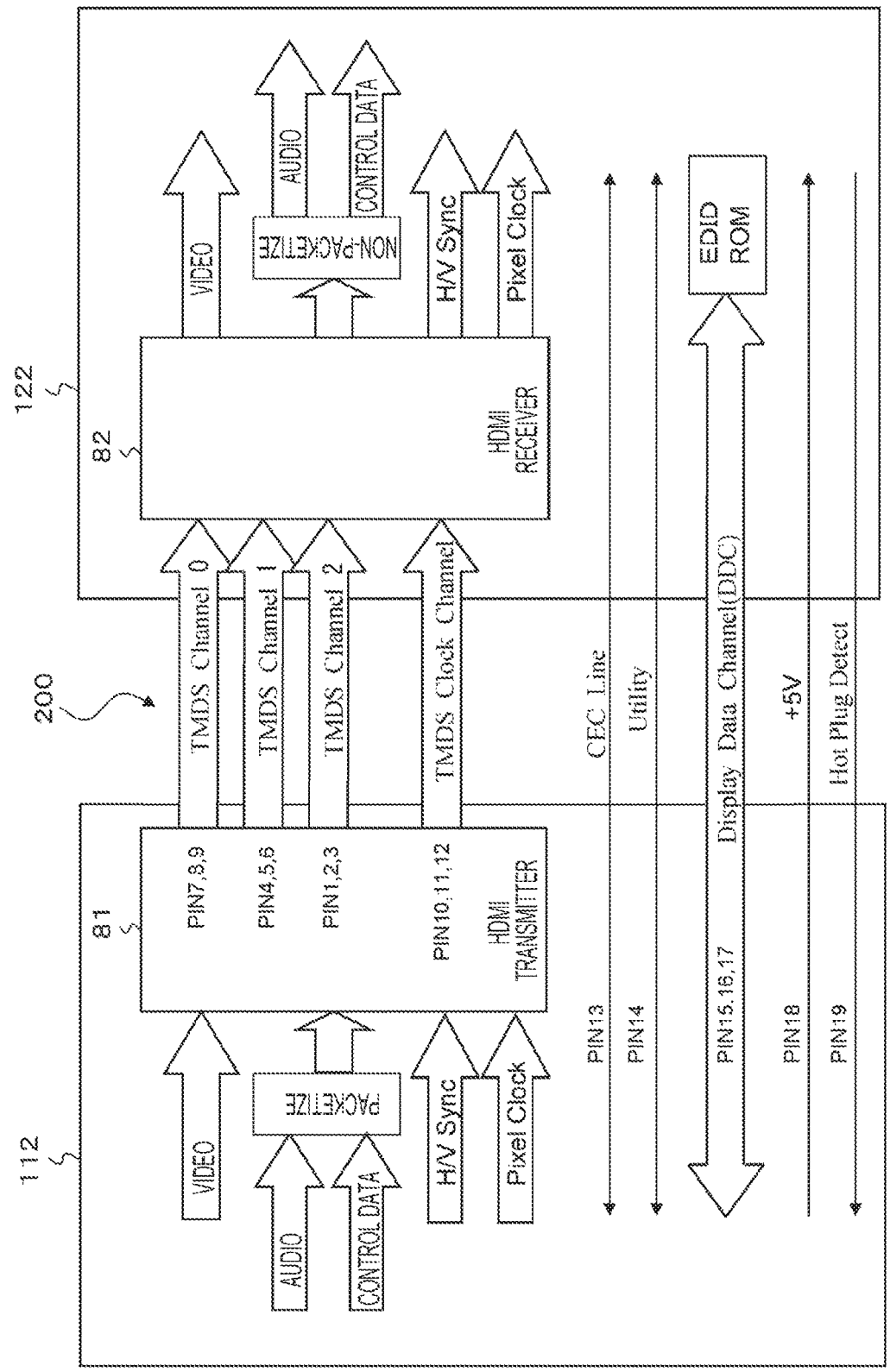
FIG. 3 is a diagram of an exemplary configuration (at the time of an operation mode of a current HDMI) of a data transmitting unit of the source device and a data receiving unit of the sink device.
Figure 4:
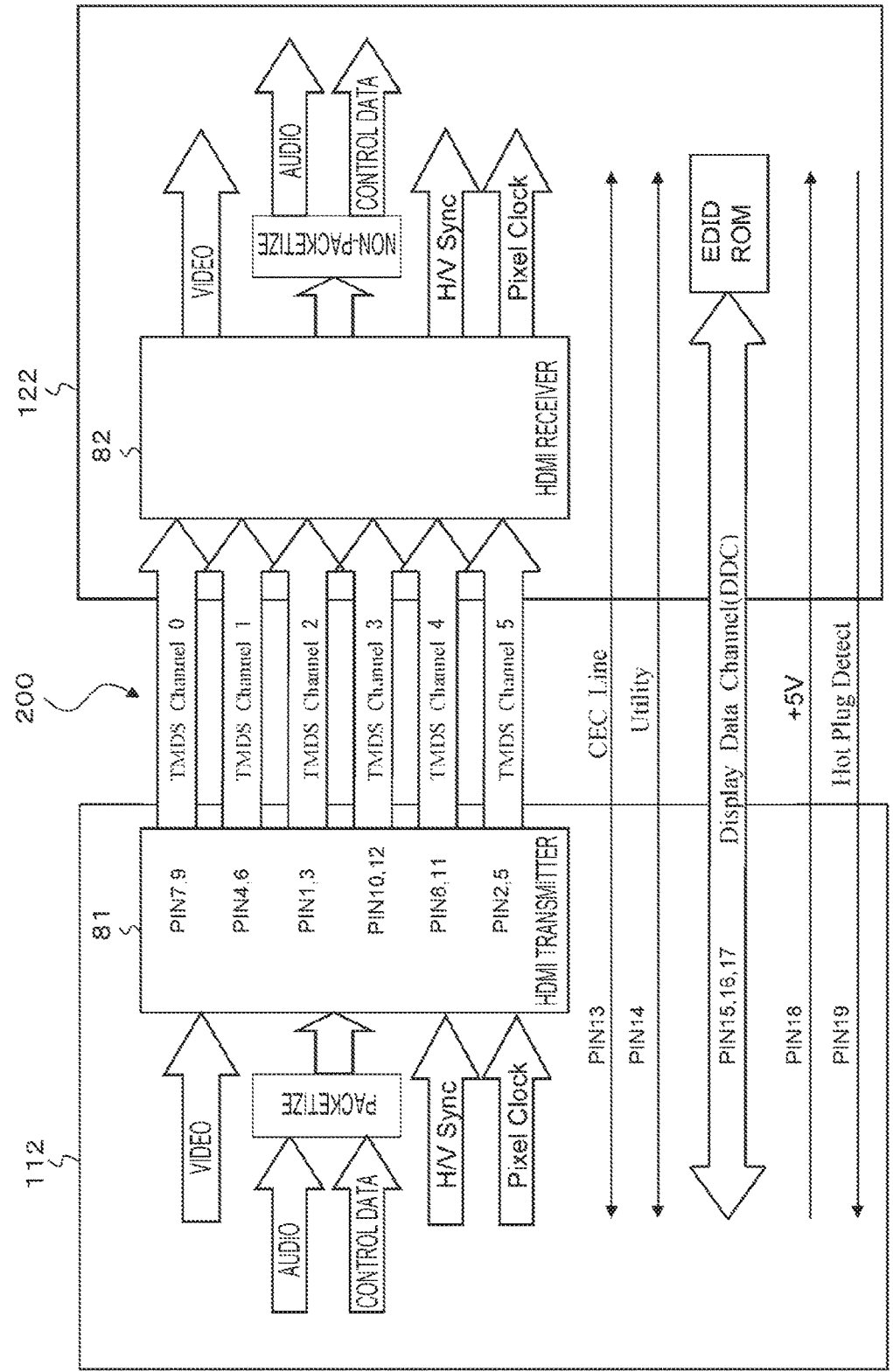
FIG. 4 is a diagram of an exemplary configuration (at the time of an operation mode of a new HDMI) of a data transmitting unit of the source device and a data receiving unit of the sink device.

FIGS. 3 and 4 are exemplary configurations of the data transmitting unit 112 of the source device 110 and the data receiving unit 122 of the sink device 120 in the AV system 100 in FIG. 1. The data transmitting unit 112 transmits a differential signal corresponding to uncompressed video data for one screen to the data receiving unit 122 in a single direction through a plurality of channels in an effective video period (also referred to as "active video period").

Here, the effective video period is a period from one vertical synchronizing signal to a next vertical synchronizing signal other than a horizontal retrace period and a vertical retrace period. Also, the data transmitting unit 112 transmits at least a differential signal corresponding to audio data and control data associated with video data and other auxiliary data to the data receiving unit 122 in a single direction through a plurality of channels in the horizontal retrace period or the vertical retrace period.

The data receiving unit 122 receives the differential signal, which corresponds to the video data, transmitted from the data transmitting unit 122 in a single direction through the plurality of channels in the active video period. Also, the data receiving unit 122 receives the differential signal, which corresponds to the audio data and the control data, transmitted from the data transmitting unit 112 in a single direction through the plurality of channels in the horizontal retrace period or the vertical retrace period.

An HDMI system including the data transmitting unit 112 and the data receiving unit 122 has following transmission channels. The HDMI system includes a differential signal channel as a transmission channel. The number of the differential signal channels for transmitting the digital signal such as video data is three in the current HDMI. However, the number of the differential signal channels is six in the new HDMI.

The differential signal channel in the operation mode of the current HDMI is described. As illustrated in FIG. 3, three TMDS channels #0 to #2 are used as transmission channels to serially transmit the video data and the audio data from the data transmitting unit 112 to the data receiving unit 122 in a single direction synchronously with a pixel clock. Also, a TMDS clock channel is used as a transmission channel for transmitting a TMDS clock. These channels are DC coupled with the cable 200.

For example, an HDMI transmitter 81 of the data transmitting unit 112 performs TMDS coding to uncompressed video data, and after that, converts it to the corresponding differential signal. Then, the three TMDS channels #0 to #2 serially transmit the differential signals to the data receiving unit 122, which is connected via the cable 200, in a single direction. Also, the HDMI transmitter 81 performs the TMDS coding to the audio data associated with the uncompressed video data, necessary control data, and other auxiliary data, and after that, converts them to the corresponding differential signals. Then, the three TMDS channels #0 to #2 serially transmit the differential signals to the data receiving unit 122 in a single direction.

In addition, the HDMI transmitter 81 transmits the TMDS clock (pixel clock) synchronized with the video data transmitted through the three TMDS channels #0 to #2 to the data receiving unit 122, which is connected via the cable 200, through the TMDS clock channel. Here, a single TMDS channel #i (i=0, 1, 2) transmits 10-bit data in a single TMDS clock.

Here, the TMDS coding is 8 bit/10 bit conversion coding for converting 8-bit data into 10-bit data. With the TMDS coding, a bad effect such as unnecessary radiation is reduced by reducing transition points from the previous data, and a DC balance is maintained. Therefore, since a run-length of coding cannot be theoretically secured, it is necessary to form DC coupling and to separately transmit a clock.

An HDMI receiver 82 of the data receiving unit 122 receives the differential signals which correspond to the video data and the differential signals corresponding to the audio data and the control data transmitted from the data transmitting unit 112 in a single direction through the TMDS channels #0 to #2. In this case, the HDMI receiver 82 synchronizes the differential signal with the TMDS clock (pixel clock) transmitted from the data transmitting unit 112 through the TMDS clock channel to receive it.

Next, the differential signal channel in the operation mode of the new HDMI is described. As illustrated in FIG. 4, six TMDS channels #0 to #5 are used as transmission channels to serially transmit the video data and the audio data from the data transmitting unit 112 to the data receiving unit 122 in a single direction synchronously with a pixel clock. Note that, in the new HDMI, transmission of the TMDS clock is omitted, and a self-clock system for reproducing the clock from the received data is employed at the reception side.

Here, the TMDS channels #0 to #2 respectively correspond to the TMDS channels #0 to #2 in the operation mode of the current HDMI. Also, the TMDS channel #3 corresponds to the TMDS clock channel in the operation mode of the current HDMI. That is, the four channels are used in the operation mode of the current HDMI and the operation mode of the new HDMI in common. Although the four channels are DC coupled with the cable 200 as described above, the TMDS channels #4 and #5 are AC coupled with the cable 200. An advantage to a high-speed operation is secured.

For example, the HDMI transmitter 81 of the data transmitting unit 112 converts the uncompressed video data to the corresponding differential signal and serially transmits the signal to the data receiving unit 122 which is connected via the cable 200 through the six TMDS channels #0 to #5 in a single direction. Also, the HDMI transmitter 81 converts the audio data associated with the uncompressed video data, necessary control data, and other auxiliary data to the corresponding differential signals and serially transmits the differential signals to the data receiving unit 122 through the six TMDS channels #0 to #5 in a single direction.

Here, the HDMI transmitter 81 performs the TMDS coding to the data to be transmitted through the TMDS channels #0 to #2. However, the HDMI transmitter 81 performs 8B10B coding which can extract a clock to the data to be transmitted through the TMDS channels #3 to #5 in the present embodiment. The ANSI 8B10B coding is 8 bit/10 bit conversion coding similarly to the TMDS coding.

The ANSI 8B10B coding can recognize each 8-bit data boundary from the transmission data by appropriately inserting a certain pattern and also can directly extract a transmission clock. Also, the ANSI 8B10B coding is complete DC free coding and in which run-length is secured, and the differential signal can be AC coupled.

The HDMI receiver 82 of the data receiving unit 122 receives the differential signal corresponding to the video data and the differential signal corresponding to the audio data and the control data transmitted from the data transmitting unit 112 in a single direction through the TMDS channels #0 to #5. In this case, the HDMI receiver 82 extracts a clock from the reception data of either one of the TMDS channels #4 and #5, the TMDS channel #5 in the present embodiment, and the HDMI receiver 82 receives the data of the TMDS channels #0 to #5 synchronously with the clock.

Furthermore, the transmission channels of the HDMI system include transmission channels referred to as a display data channel (DDC) and a CEC line in addition to the TMDS channels and the TMDS clock channel. The DDC includes two signal lines, which are not shown, included in the cable 200. The DDC is used to read enhanced extended display identification data (E-EDID) from the data receiving unit 122 by the data transmitting unit 112.

That is, in addition to the HDMI receiver 82, the data receiving unit 122 includes an EDID ROM (EEPROM) for storing E-EDID which is capability information on the configuration/capability of the data receiving unit 122. The data transmitting unit 112, for example, reads the E-EDID from the data receiving unit 122 connected via the cable 200 via the DDC in response to a request from the control unit 113.

The data transmitting unit 112 transmits the read E-EDID to the control unit 113. The control unit 113 stores the E-EDID in a flash ROM or a DRAM which is not shown. The control unit 113 can recognize a setting of the capability of the data receiving unit 122 on the basis of the E-EDID. For example, the control unit 113 recognizes whether the sink device 120 including the data receiving unit 122 is compliant with the new HDMI in addition to the current HDMI. The CEC line includes a single signal line, which is not shown, included in the cable 200 and is used to bidirectionally transmit control data between the data transmitting unit 112 and the data receiving unit 122.

Also, the cable 200 includes a line (HPD line) connected to a pin referred to as a hot plug detect (HPD). The source device uses the HPD line to detect the connection of the sink device. Furthermore, the HPD line is also used as a HEAC-line forming a bidirectional communication path. Also, the cable 200 includes a power supply line (+5 V Power Line) used to supply power from the source device to the sink device. In addition, the cable 200 further includes a utility line. The utility line is also used as a HEAC+ line forming a bidirectional communication path.

Figure 5:
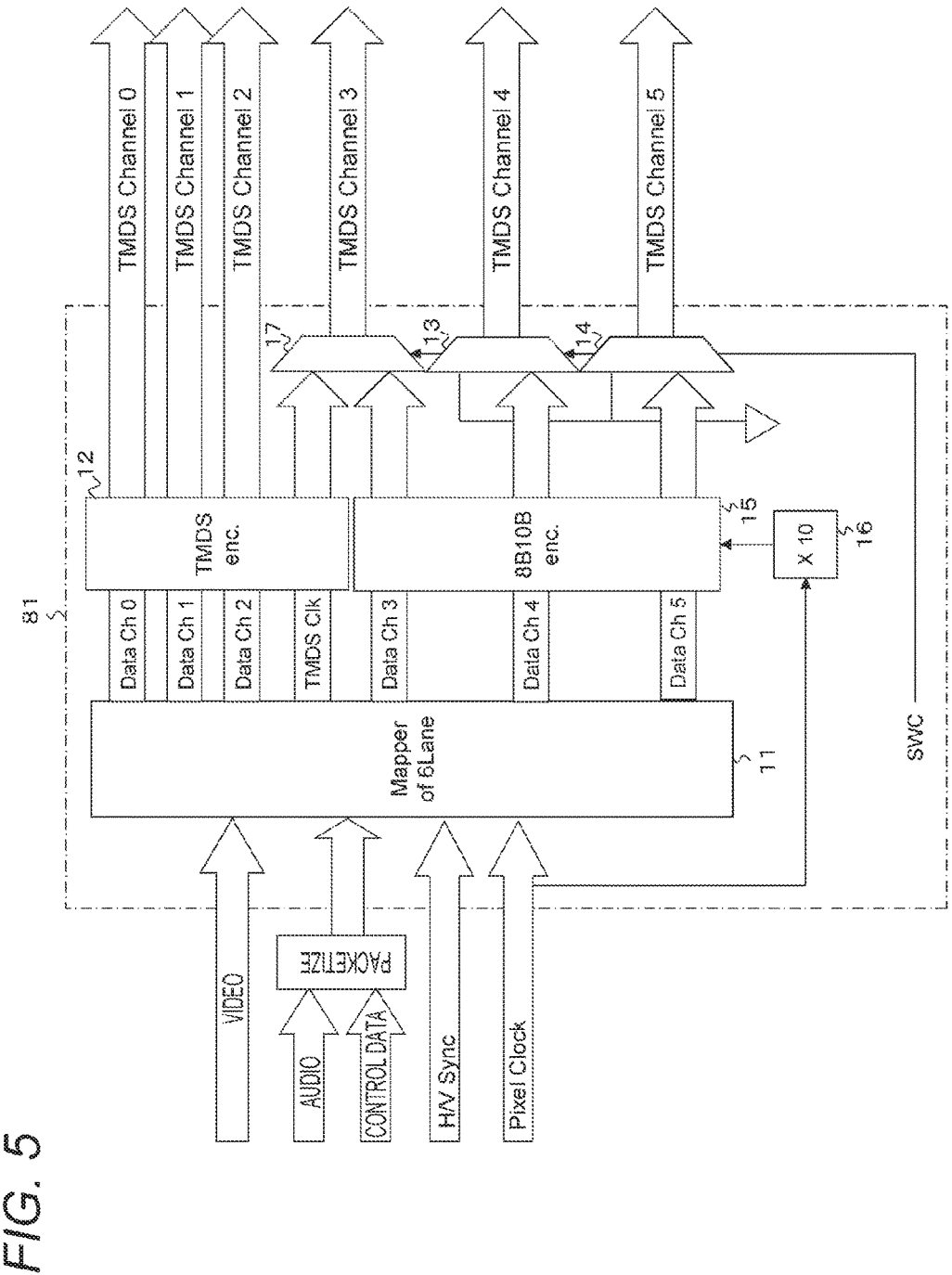
FIG. 5 is a block diagram of an exemplary configuration of an HDMI transmitter.

FIG. 5 is a diagram of an exemplary configuration of the HDMI transmitter 81. The HDMI transmitter 81 includes a 6-lane (6-channel) mapper 11, a TMDS encoder 12, changeover switches 13 and 14, an 8B10B encoder 15, a multiplier 16, and a changeover switch 17.

The mapper 11 performs mapping processing to video data, packetized audio data and control data, and vertical and horizontal synchronization signals to be input and outputs the data of the data channels #0 to #5. Also, the mapper 11 outputs a pixel clock to be input as a TMDS clock. The TMDS encoder 12 synchronizes the data of the data channels #0 to #2 output from the mapper 11 with the TMDS clock output from the mapper 11 and performs encode processing with the TMDS coding to the obtained data. Then, the TMDS encoder 12 obtains transmission data of the TMDS channels #0 to #2.

The 8B10B encoder 15 performs encode processing with the ANSI 8B10B coding to the data of the data channels #3 to #5 output from the mapper 11.

Also, the changeover switch 13 switches the data of the data channel #4 output from the 8B10B encoder 15 with the ground and outputs it. Switching of the changeover switch 13 is controlled on the basis of a switching control signal SWC. The changeover switch 13 outputs the ground in the operation mode of the current HDMI and outputs the data of the data channel #4 in the operation mode of the new HDMI.

Also, the changeover switch 14 selectively switches the data of the data channel #5 output from the 8B10B encoder 15 with the ground and outputs it. Switching of the changeover switch 14 is controlled on the basis of the switching control signal SWC. The changeover switch 14 outputs the ground in the operation mode of the current HDMI and outputs the data of the data channel #5 in the operation mode of the new HDMI.

The multiplier 16 generates a bit clock by 10 multiples the input pixel clock and supplies the bit clock to the 8B10B encoder 15. The changeover switch 17 selectively switches the coding result of the data channel #3 output from the 8B10B encoder 15 with the TMDS clock and transmits it as the transmission data of the TMDS channel #3 (TMDS clock channel). Switching of the changeover switch 17 is controlled on the basis of the switching control signal SWC. The changeover switch 17 outputs the TMDS clock in the operation mode of the current HDMI and outputs the coding result of the data channel #3 in the operation mode of the new HDMI.

An operation of the HDMI transmitter 81 illustrated in FIG. 5 is described. An operation of the HDMI transmitter 81 in the operation mode of the current HDMI is described first. The data of the data channels #0 to #2 and the TMDS clock are obtained from the mapper 11. The data of the data channels #0 to #2 is supplied to the TMDS encoder 12.

The TMDS encoder 12 synchronizes the data of the data channels #0 to #2 with the TMDS clock and performs the encode processing with the TMDS coding to the synchronized data. Then, the TMDS encoder 12 obtains the transmission data of the TMDS channels #0 to #2. Also, the TMDS clock output from the mapper 11 is used as the transmission data of the TMDS clock channel (TMDS channel #3) via the changeover switch 17.

Next, an operation in the operation mode of the new HDMI is described. The data of the data channels #0 to #5 and the TMDS clock are obtained from the mapper 11. The data of the data channels #0 to #2 is supplied to the TMDS encoder 12. The TMDS encoder 12 synchronizes the data of the data channels #0 to #2 with the TMDS clock and performs the encode processing with the TMDS coding to the synchronized data. Then, the TMDS encoder 12 obtains the transmission data of the TMDS channels #0 to #2.

Also, the data of the data channels #3 to #5 is supplied to the 8B10B encoder 15. The 8B10B encoder 15 synchronizes the data of the data channels #3 to #5 with the bit clock and performs encode processing with the ANSI 8B10B coding to the obtained data. Then, the 8B10B encoder 15 obtains the transmission data of the TMDS channels #3 to #5.

Figure 6:
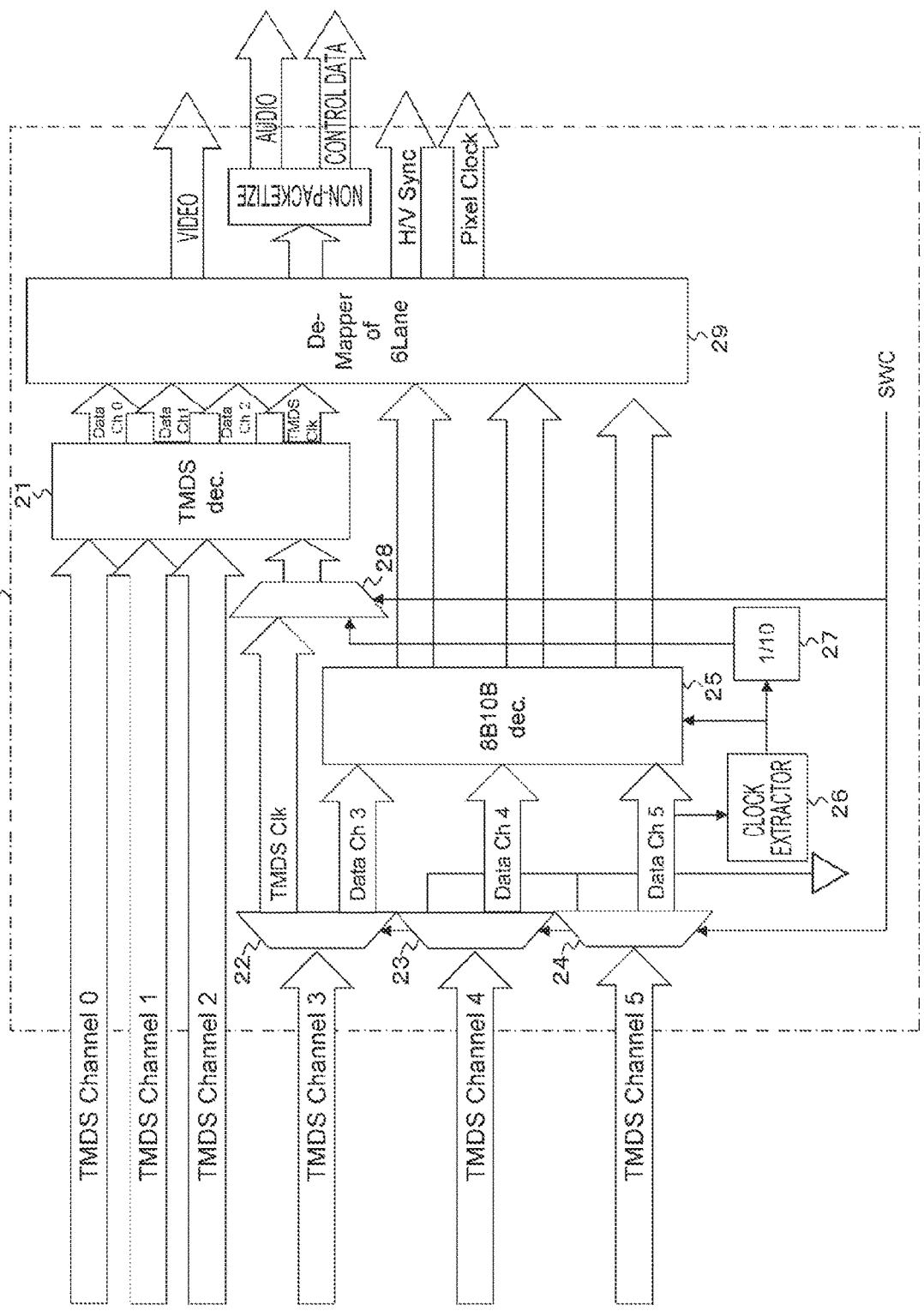
FIG. 6 is a block diagram of an exemplary configuration of an HDMI receiver.

FIG. 6 is a diagram of an exemplary configuration of the HDMI receiver 82. Note that this is an example of a case where the data receiving unit 122 of the sink device 120 is compliant with both the current HDMI and the new HDMI. The HDMI receiver 82 includes a TMDS decoder 21, changeover switches 22 to 24, an 8B10B decoder 25, a clock extractor 26, a divider 27, a changeover switch 28, and a 6-lane (6-channel) demapper 29.

The TMDS decoder 21 performs decode processing with the TMDS coding to the reception data of the TMDS channels #0 to #2 and obtains the data of the data channels #0 to #2. The changeover switch 22 sorts and outputs reception data of the TMDS channel #3 (TMDS clock channel). Switching of the changeover switch 22 is controlled on the basis of the switching control signal SWC. The changeover switch 22 outputs the data to the side of the TMDS clock in the operation mode of the current HDMI and outputs the data to the side of the data channel #3 in the operation mode of the new HDMI.

The changeover switch 23 sorts and outputs reception data of the TMDS channel #4. Switching of the changeover switch 23 is controlled on the basis of the switching control signal SWC. The changeover switch 23 outputs the data to the side of the ground in the operation mode of the current HDMI and outputs the data to the side of the data channel #4 in the operation mode of the new HDMI. Also, the changeover switch 24 sorts and outputs reception data of the TMDS channel #5. Switching of the changeover switch 24 is controlled on the basis of the switching control signal SWC. The changeover switch 24 outputs the data to the side of the ground in the operation mode of the current HDMI and outputs the data to the side of the data channel #5 in the operation mode of the new HDMI.

The 8B10B decoder 25 performs decode processing with the ANSI 8B10B coding to the data respectively output from the changeover switches 22 to 24 to the sides of the data channels #3 to #5 and obtains data of the data channels #3 to #5.

The clock extractor 26 extracts a bit clock from the data output from the changeover switch 24 to the side of the data channel #5 and supplies the bit clock to the 8B10B decoder 25. The divider 27 divides the bit clock extracted by the clock extractor 26 into 1/10 to obtain a TMDS clock (pixel clock).

The changeover switch 28 selectively switches the TMDS clock (pixel clock) output from the changeover switch 22 to the side of the TMDS clock and the TMDS clock obtained by the divider 27 and supplies it to the TMDS decoder 21. Switching of the changeover switch 28 is controlled on the basis of the switching control signal SWC. The changeover switch 28 selects the TMDS clock output from the changeover switch 22 in the operation mode of the current HDMI and selects the TMDS clock obtained by the divider 27 in the operation mode of the new HDMI.

The demapper 29 performs demapping processing to the data of the data channels #0 to #2 obtained by the TMDS decoder 21, the TMDS clock (pixel clock) selected by the changeover switch 28, and the data of the data channels #3 to #5 obtained by the 8B10B decoder 25 and obtains video data, packetized audio data and control data, vertical and horizontal synchronization signals, and a pixel clock. The demapper 29 performs the processing reverse to that of the mapper 11 of the HDMI transmitter 81 in FIG. 5.

An operation of the HDMI receiver 82 illustrated in FIG. 6 is described. An operation of the HDMI transmitter 81 in the operation mode of the current HDMI is described first. In this case, the TMDS channels #0 to #2 receive the data, and also the TMDS channel #3 (TMDS clock channel) receives the TMDS clock. The reception data of the TMDS channels #0 to #2 is supplied to the TMDS decoder 21.

The TMDS decoder 21 synchronizes the reception data of the TMDS channels #0 to #2 with the TMDS clock and performs the decode processing with the TMDS coding to the synchronized data. Then, the TMDS decoder 21 obtains the data of the data channels #0 to #2. The data of the data channels #0 to #2 is supplied to the demapper 29.

Also, the TMDS clock received by the TMDS channel #3 (TMDS clock channel) is supplied to the demapper 29 via the changeover switches 22 and 28. The demapper 29 performs demapping processing to the data of the data channels #0 to #2 and the TMDS clock (pixel clock) and obtains video data, packetized audio data and control data, vertical and horizontal synchronization signals, and a pixel clock.

Next, an operation in the operation mode of the new HDMI is described. In this case, the TMDS channels #0 to #5 receive the data. The reception data of the TMDS channels #0 to #2 is supplied to the TMDS decoder 21. The TMDS decoder 21 synchronizes the reception data of the TMDS channels #0 to #2 with the TMDS clock and performs the decode processing with the TMDS coding to the synchronized data. Then, the TMDS decoder 21 obtains the data of the data channels #0 to #2. The data of the data channels #0 to #2 is supplied to the demapper 29.

Also, the reception data of the TMDS channels #3 to #5 is supplied to the 8B10B decoder 25 respectively via the changeover switches 22 to 24. Also, the reception data of the TMDS channel #5 is supplied to the clock extractor 26, and a bit clock is extracted from the supplied data. The bit clock is supplied to the divider 27 and the 8B10B decoder 25.

The 8B10B decoder 25 synchronizes the reception data of the TMDS channels #3 to #5 with the bit clock and performs decode processing with the ANSI 8B10B coding to the synchronized data. Then, the data of the data channels #3 to #5 is obtained. The data of the data channels #3 to #5 is supplied to the demapper 29.

Also, the divider 27 divides the bit clock into 1/10 to generate a TMDS clock (pixel clock). The TMDS clock is supplied to the TMDS decoder 21 via the changeover switch 28. The demapper 29 performs demapping processing to the data of the data channels #0 to #5 and the TMDS clock (pixel clock) and obtains video data, packetized audio data and control data, vertical and horizontal synchronization signals, and a pixel clock.

Figure 7:
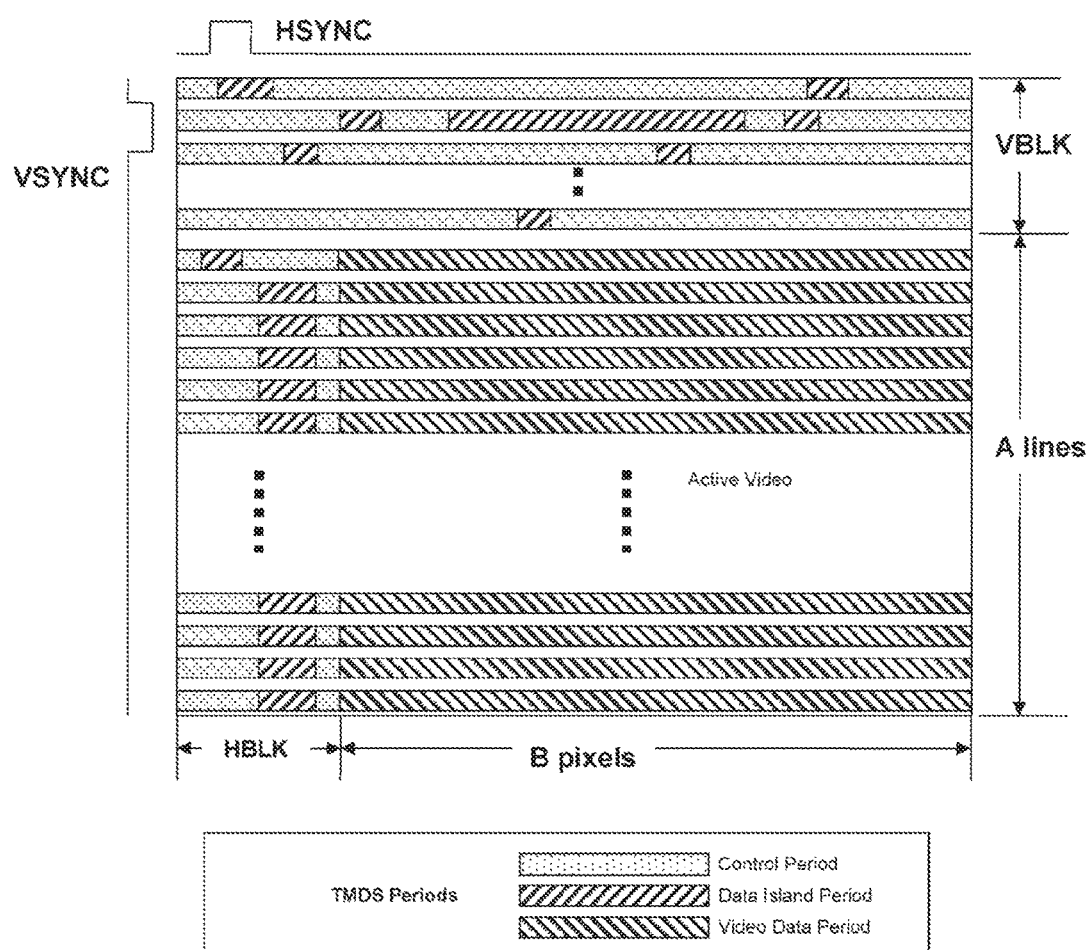
FIG. 7 is a diagram of an exemplary structure of TMDS transmission data.

FIG. 7 is a diagram of an exemplary structure of TMDS transmission data. In FIG. 7, periods of various transmission data in a case where image data of which an aspect ratio is B pixel×A line is transmitted in the TMDS channels #0 to #2 or the TMDS channels #0 to #5 are illustrated. A video field where the transmission data is transmitted in the TMDS channel of the HDMI includes three kinds of periods corresponding to the kinds of the transmission data. The three kinds of periods are a Video Data period, a Data Island period, and a Control period.

Here, the video field period is a period from a rising edge (active edge) of one vertical synchronizing signal to a rising edge of a next vertical synchronizing signal. The video field period is divided into three periods, i.e., a horizontal blanking period, a vertical blanking period, and an active video period. The Video Data period which is a period in the video field period other than the horizontal blanking period and the vertical blanking period is allocated to the active video period. In the Video Data period, data of an active pixel, of which an aspect ratio is B pixel×A line, for forming uncompressed image data for one screen is transmitted.

The Data Island period and the Control period are respectively allocated to the horizontal blanking period and the vertical blanking period. In the Data Island period and the Control period, auxiliary data is transmitted. That is, the Data Island period is allocated to a part of the horizontal blanking period and the vertical blanking period. In the Data Island period, for example, a packet of audio data, which does not relate to the control, of the auxiliary data is transmitted. The Control period is allocated to the other part of the horizontal blanking period and the vertical blanking period. In the Control period, for example, a vertical synchronizing signal, a horizontal synchronization signal, and a control packet which relate to the control of the auxiliary data are transmitted.

Here, a pin assignment of the receptacle 111 is described. A pin assignment (type A) of the current HDMI is described first. The pin assignment of the current HDMI forms a first pin assignment. FIG. 8(a) is a diagram of the pin assignment of the current HDMI. TMDS Data #i+ and TMDS Data #i− which are differential signals of the TMDS channel #i (i=0 to 2) are transmitted through two lines which are differential lines. Pins (pins having numbers of 7, 4, and 1) are allocated to the TMDS Data #i+, and pins (pins having numbers of 9, 6, and 3) are allocated to the TMDS Data #i−. Furthermore, pins having pin numbers of 8, 5, and 2 are allocated to TMDS Data #i Shield (i=0 to 2).

A TMDS Clock+ and a TMDS Clock− which are differential signals of the TMDS clock channel are transmitted through two lines which are the differential lines. A pin having a pin number of 10 is allocated to the TMDS Clock+, a pin having a pin number of 12 allocated to the TMDS Clock−. Furthermore, a pin having a pin number of 11 is allocated to the TMDS Clock Shield.

Also, a CEC signal which is data for control is transmitted through a CEC line. A pin having a pin number of 13 is allocated to the CEC signal. Also, a serial data (SDA) signal used to read the E-EDID is transmitted through an SDA line. A pin having a pin number of 16 is allocated to an SDA signal. Also, a serial clock signal (SCL) which is a clock signal used for synchronization at the time of transmitting/receiving the SDA signal is transmitted through an SCL line. A pin having a pin number of 15 is allocated to the SCL. Furthermore, the DDC line includes the SDA line and the SCL line.

Also, a pin having a pin number of 19 is allocated to HPD/HEAC−. Also, a pin having a pin number of 14 is allocated to utility/HEAC+. Also, a pin having a pin number of 17 is allocated to DDC/CEC Ground/HEAC Shield. In addition, a pin having a pin number of 18 is allocated to a power supply (+5 V Power).

Next, a pin assignment of the new HDMI is described. The pin assignment of the new HDMI forms a second pin assignment. FIG. 8(b) is a diagram of the pin assignment of the new HDMI. The TMDS Data #i+ and the TMDS Data #i− which are the differential signals of the TMDS channels #i (i=0 to 5) are transmitted through two lines which are differential lines. Pins (pins having pin numbers of 7, 4, 1, 10, 8, and 2) are allocated to the TMDS Data #i+, and pins (pins having pin numbers of 9, 6, 3, 12, 11, and 5) are allocated to the TMDS Data #i−.

Also, a CEC signal which is data for control is transmitted through a CEC line. A pin having a pin number of 13 is allocated to the CEC signal. Also, a serial data (SDA) signal used to read the E-EDID is transmitted through an SDA line. A pin having a pin number of 16 is allocated to an SDA signal. Also, a serial clock signal (SCL) which is a clock signal used for synchronization at the time of transmitting/receiving the SDA signal is transmitted through an SCL line. A pin having a pin number of 15 is allocated to the SCL. Furthermore, the DDC line includes the SDA line and the SCL line.

Also, a pin having a pin number of 19 is allocated to HPD/HEAC−. Also, a pin having a pin number of 14 is allocated to utility/HEAC+. Also, a pin having a pin number of 17 is allocated to DDC/CEC Ground/HEAC Shield. In addition, a pin having a pin number of 18 is allocated to a power supply (+5 V Power).

As described above, in the new HDMI pin assignment (refer to FIG. 8(b)), terminals (pins having the pin numbers of 2, 5, 8, and 11) which are used as shield terminals in the current HDMI pin assignment (refer to FIG. 8(a)) are used as data terminals. Also, in the new HDMI pin assignment, terminals (pins having pin numbers of 10 and 12) used as signal terminals of the differential signal of the clock signal in the current HDMI pin assignment are used as data terminals.

The data transmitting unit 112 of the source device 110 selects the current HDMI pin assignment illustrated in FIG. 8(a) when operated in the operation mode of the current HDMI and selects the new HDMI pin assignment illustrated in FIG. 8(b) when operated in the operation mode of the new HDMI. Note that the pin assignment of the receptacle 111 of the source device 110 has been described above. Although the description is omitted, the above description is similarly applied to the pin assignment of the receptacle 121 of the sink device 120 in a case where the data receiving unit 122 of the sink device 120 is compliant with both the current HDMI and the new HDMI.

FIGS. 9(a) and 9(b) are diagrams of the pin arrangements of the receptacle 111 of the source device 110. FIG. 9(a) is a diagram of the pin arrangement of the current HDMI, and FIG. 9(b) is a diagram of the pin arrangement of the new HDMI. Furthermore, when the current HDMI pin assignment is selected as the pin assignment of the receptacle 111, the pins having the pin numbers of 2, 5, 8, and 11 are grounded in the source device 110 and the sink device 120, or grounded in the sink device 120 and in a high impedance state in the source device 110, or in a high impedance state in the sink device 120 and grounded in the source device 110. Furthermore, although the description is omitted, the above description is similarly applied to the pin arrangement of the receptacle 121 of the sink device 120 in a case where the data receiving unit 122 of the sink device 120 is compliant with both the current HDMI and the new HDMI.

FIG. 10(a) is a diagram of an exemplary structure of the current HDMI cable used as the cable 200. In the current HDMI cable, a shielded twisted pair part includes three data line pairs to obtain respective characteristics. Also, the shielded twisted pair part includes a clock line pair and a line pair of utility and HPD for a HEAC function.

FIG. 10(b) is a diagram of an exemplary structure of the shielded twisted pair part. The shielded twisted pair part includes two electric wires 3 and a drain line 4 covered with a shield member 5. Furthermore, in the electric wire 3, a core wire 1 is covered with a covering part 2.

In the current HDMI cable, the drain line included in each shielded twisted pair part of the data and the clock is connected to a pin of a plug attached to the end of the cable. In this case, each drain line is connected to a pin (terminal) corresponding to each shield terminal (shield pins having pin numbers 2, 5, 8, and 11) of the receptacle (current HDMI pin arrangement). The shield terminals are grounded in the source device 110 and the sink device 120. Accordingly, the drain line for configuring each shielded twisted pair part of the data and the clock is grounded in a state where the plug is connected to the receptacle (current HDMI pin arrangement).

Figure 11:
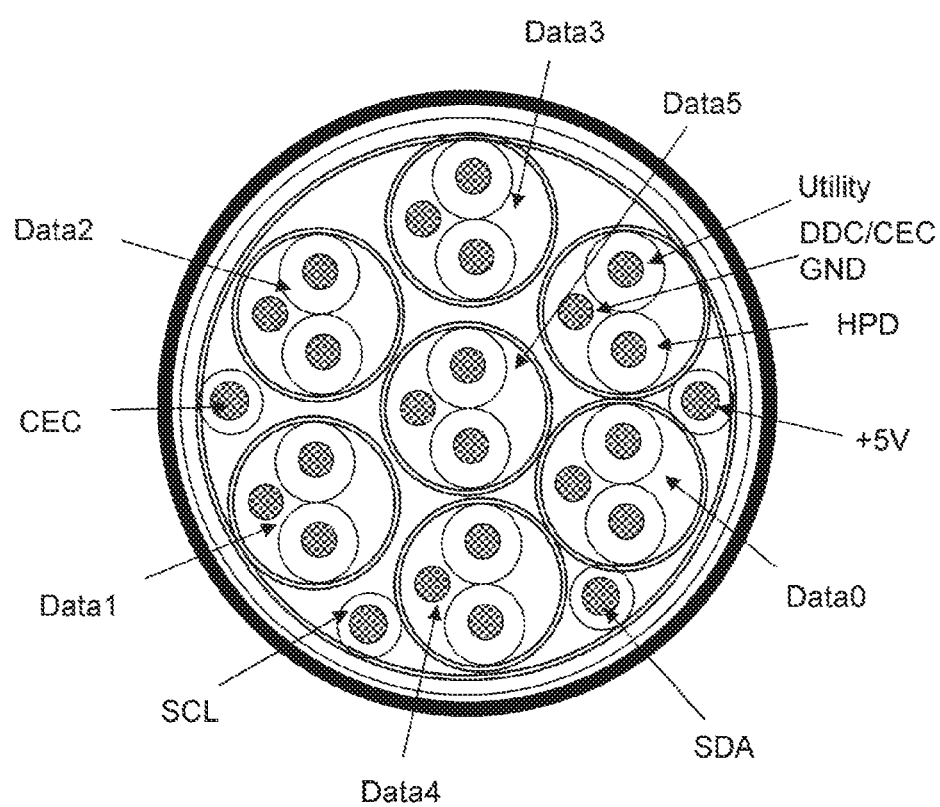
FIG. 11 is a diagram of an exemplary structure of a new HDMI cable.

FIG. 11 is a diagram of an exemplary structure of a new HDMI cable used as the cable 200. In the new HDMI cable, a shielded twisted pair part includes six data line pairs to obtain respective characteristics. Also, the shielded twisted pair part includes a line pair of utility and HPD for a HEAC function.

Figure 10:
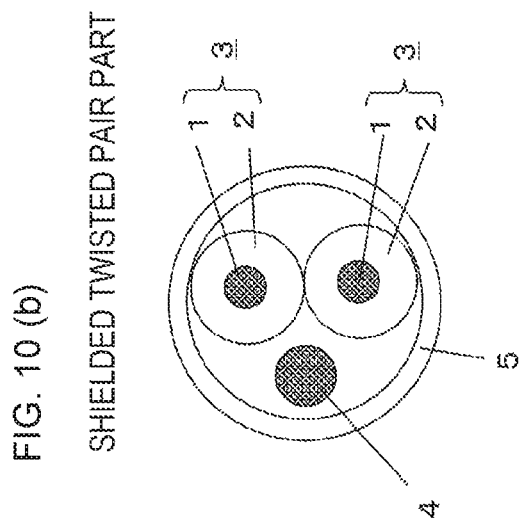
FIGS. 10(a) and 10(b) are diagrams of an exemplary structure of a current HDMI cable.
Figure 10:
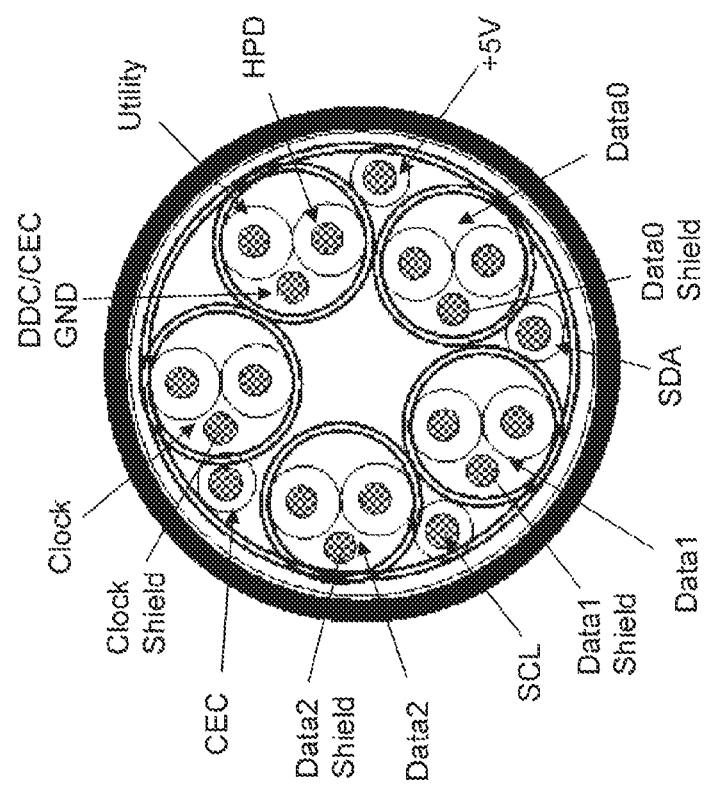

The new HDMI cable has more copper wires to be connected than the current HDMI cable (refer to FIG. 10(*a*)). In the new HDMI cable, a drain line for configuring each shielded twisted pair part connected with dedicated pins of the plugs at both ends of the cable is connected to a metal shell of the plug. This opens a pin for shield and prevents an increase in the number of necessary pins of the plug. The plug in the new HDMI cable is similar to the plug of the current HDMI cable. In this way, when the drain line for configuring each shielded twisted pair part is connected to the metal shell of the plug, the shield of the differential pair line can be secured by connecting the shell of the receptacle, to which the plug is inserted, to a ground level.

"Operation Mode Control of Current HDMI and New HDMI"

Next, control of the operation mode of the control unit 113 in the source device 110 is further described. As described above, the control unit 113 controls the data transmitting unit 112 to operate in the operation mode of the new HDMI when it is determined that the cable 200 is compliant with the new HDMI and the sink device 120 is compliant with the new HDMI. Also, the control unit 113 controls the data transmitting unit 112 to operate in the operation mode of the current HDMI otherwise.

Figure 12:
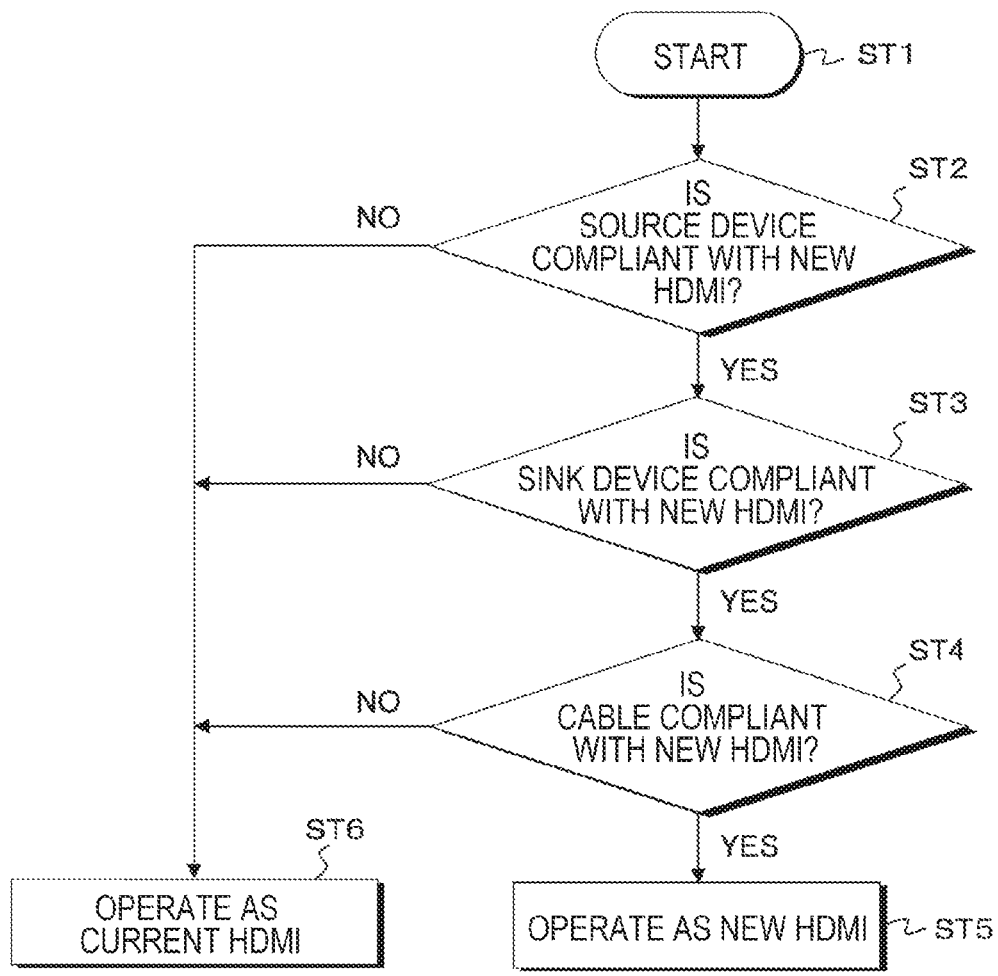
FIG. 12 is a flowchart of an exemplary procedure for controlling an operation mode by a control unit of the source device.

FIG. 12 is a flowchart of a procedure for controlling the operation mode by the control unit 113. The control unit 113 starts processing in step ST1, and after that, the control unit 113 starts processing in step ST2. The control unit 113 determines in step ST2 whether the source device 110, that is, the data transmitting unit 112 is compliant with the new HDMI. Since the control unit 113 previously has the capability information of the source device 110 (data transmitting unit 112) where the control unit 113 exists, the control unit 113 can easily make the above determination. Furthermore, in the present embodiment, since it is obvious that the source device 110 is compliant with the new HDMI, the control unit 113 may omit the determination processing in step ST2.

When it is determined that the source device 110 is compliant with the new HDMI, the control unit 113 determines in step ST3 whether the sink device 120, that is, the data receiving unit 122 is compliant with the new HDMI. This determination is described in detail below. When it is determined that the sink device 120 is compliant with the new HDMI, the control unit 113 starts processing in step ST4. In step ST4, the control unit 113 determines whether the cable 200 is compliant with the new HDMI. This determination is described in detail below.

When it is determined that the cable 200 is compliant with the new HDMI, the control unit 113 starts processing in step ST5. In step ST5, the control unit 113 controls the data transmitting unit 112 to operate in the operation mode of the new HDMI. Also, when it is determined in steps ST2, ST3, and ST4 that the source device 110, the sink device 120, and the cable 200 are not compliant with the new HDMI, the control unit 113 starts processing in step ST6. In step ST6, the control unit 113 controls the data transmitting unit 112 to operate in the operation mode of the current HDMI.

For example, when determining in step ST3 that the sink device 120 is compliant with the new HDMI, the control unit 113 transmits the final determination result on the operation mode to the sink device 120 via the cable 200. For example, the determination result is transmitted through a line such as the CEC line before the data transmission from the source device 110. In the sink device 120, the control unit 123 controls the data receiving unit 122 to operate in an operation mode same as the operation mode of the data transmitting unit 112 of the source device 110 on the basis of the determination result on the operation mode from the source device 110.

Figure 13:
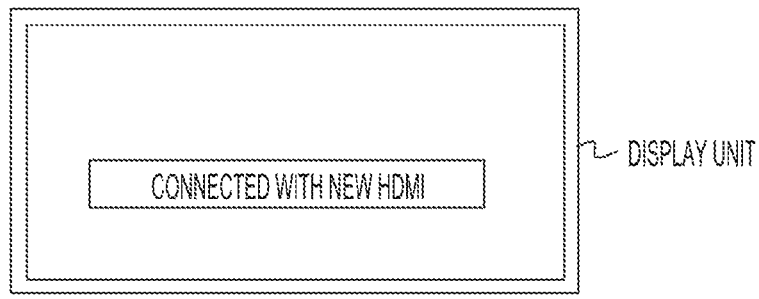
FIGS. 13(a) to 13(c) are diagrams of exemplary UI screens displayed on a display unit (display) by the control by the control unit of the source device.
Figure 13:
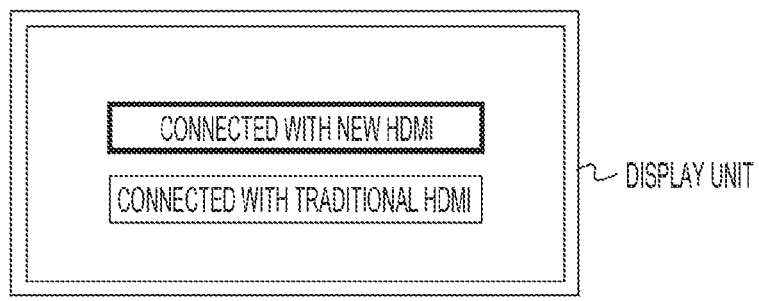
Figure 13:
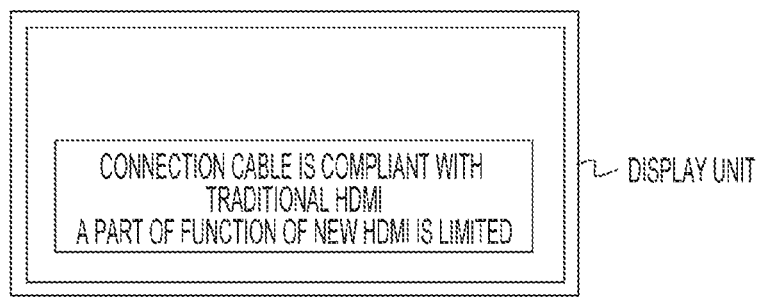

Also, when controlling the data transmitting unit 112 to operate in the operation mode of the new HDMI in step ST5, the control unit 113 may control an UI screen indicating the above control to be displayed on a display unit (display) as illustrated in FIG. 13(*a*). A user can easily recognize that the source device 110 is connected to the sink device 120 with the new HDMI from the UI screen. Note that the display unit (display) where the UI screen is displayed is a display unit (display), which is not shown, provided in the source device 110 or a display unit (display), which is not shown, provided in the sink device 120. This is similarly applied to the following UI displays.

Also, when determining that the cable 200 is not compliant with the new HDMI in step ST4 and starts the processing in step ST6, for example, the control unit 113 may control the UI screen indicating that to be displayed on a display unit (display) as illustrated in FIG. 13(*c*). From the UI screen, the user can easily recognize that the source device 110 and the sink device 120 are compliant the new HDMI and that the cable 200 is not compliant with the new HDMI. Measures such as replacement of the cable 200 with the new HDMI cable can be taken.

Also, in the procedure in the flowchart illustrated in FIG. 12, when determining that the cable 200 is compliant with the new HDMI in step ST4, the control unit 113 immediately starts step ST5 and controls the data transmitting unit 112 to operate in the operation mode of the new HDMI. However, when determining that the cable 200 is compliant with the new HDMI in step ST4 by transmitting/receiving a command through a line such as the CEC before data transmission, the control unit 113 may make the user select either one of the new HDMI or the current HDMI (traditional HDMI).

In this case, the control unit 113 controls the UI screen which makes the user select one of the HDMIs to be displayed on the display unit (display) as illustrated in FIG. 13(*b*). The user selects either one of the new HDMI or the current HDMI on the basis of the UI screen. In FIG. 13(*b*), a state is illustrated in which the "new HDMI" is selected. The control unit 113 controls the data transmitting unit 112 to operate in the operation mode of the new HDMI or the current HDMI according to the selection by the user.

Figure 14:
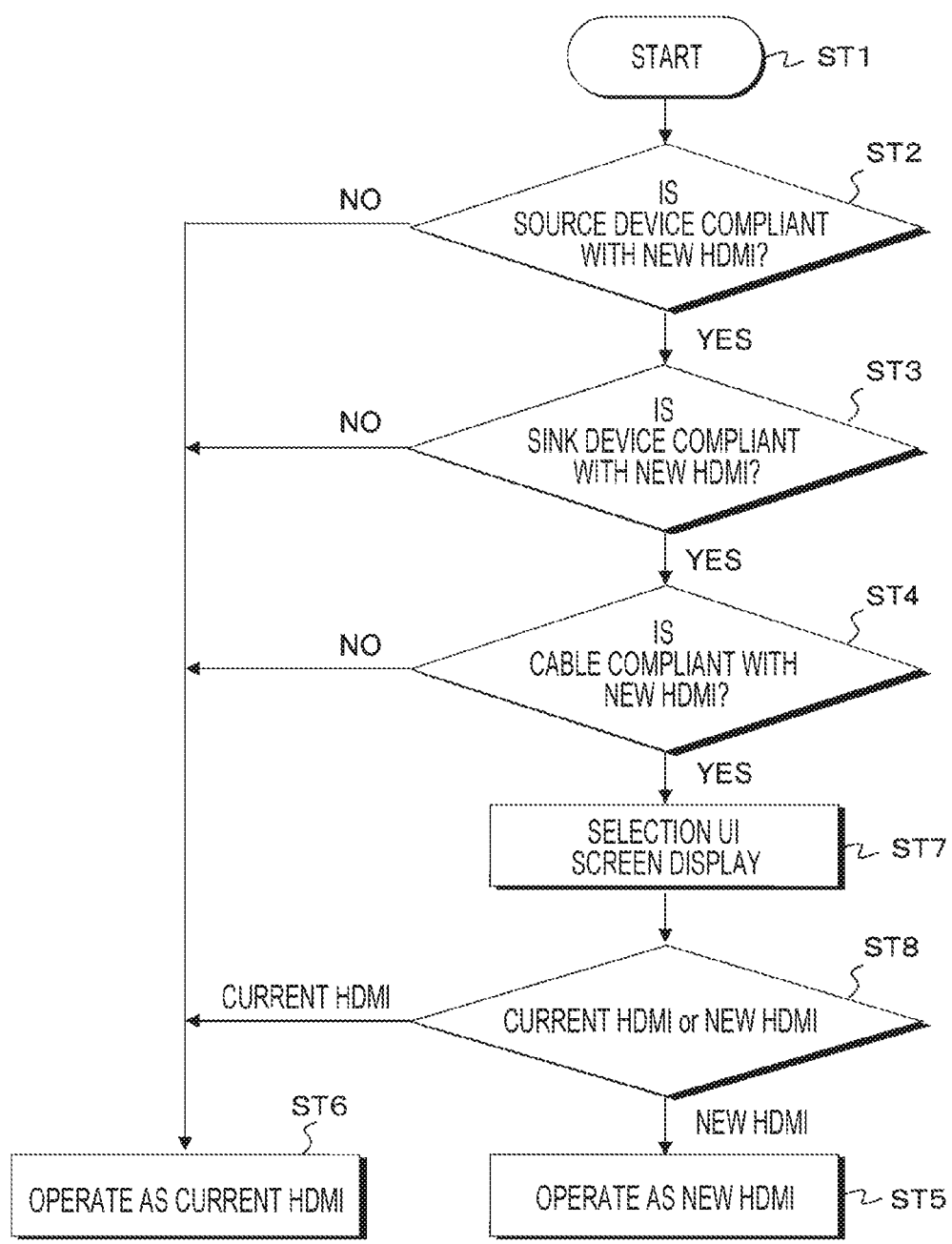
FIG. 14 is a flowchart of another example of a procedure for controlling an operation mode by the control unit of the source device.

FIG. 14 is a flowchart of a procedure for controlling the operation mode by the control unit 113 in this case. In FIG. 14, parts corresponding to those in FIG. 12 are denoted with the same reference numerals, and the description on the corresponding parts is omitted. When control unit 113 determines that the cable 200 is compliant with the new HDMI in step ST4, the procedure proceeds to step ST7. In step ST7, the control unit 113 controls the display unit (display) to display the UI screen to select either one of the new HDMI or the current HDMI. The display of the UI may be transmitted as a video signal by the source device 110 through the transmission path 200, and the sink device 120 may instruct the display to display the UI.

Subsequently, the control unit 113 starts processing in step ST8. In step ST8, the control unit 123 informs the control unit 113 of an operation by the user with a remote controller through a line such as the CEC so that the control unit 113 determines which one of the new HDMI and the current HDMI has been selected by the user. When the user has selected the new HDMI, the control unit 113 controls the data transmitting unit 112 to operate in the operation mode of the new HDMI in step ST5. On the other hand, when the user has selected the current HDMI, the control unit 113 controls the data transmitting unit 112 to operate in the operation mode of the current HDMI (traditional HDMI) in step ST6.

"Determination Whether Sink Device is Compliant with New HDMI"

A method for determining by the control unit 113 whether the sink device 120 is compliant with the new HDMI is described. For example, a first determination method and a second determination method below are exemplified as the determination method.

"First Determination Method"

The control unit 113 determines whether the sink device 120 is compliant with the new HDMI on the basis of the EDID read from the sink device 120 with the DDC line (SDA line and SCL line) of the cable 200. The EDID has a data structure specified by a format. It is assumed that flag information be newly defined in a predetermined position in the EDID. The flag information indicates whether the sink device 120 is compliant with the new HDMI (new transmission).

FIG. 15 is an example of flag information newly defined in the EDID. Originally, the EDID is a data structure indicating capabilities of various sink devices 120. For easy description, bites of the EDID relating to the present invention are illustrated in FIG. 15, and FIG. 15 is simplified by illustrating minimum components. In a second bit, one-bit flag information "New Rx Sink" is written which indicates whether the sink device 120 is compliant with the new HDMI. Also, in a first bit, one-bit flag information "New Cable" indicating whether the cable 200 is compliant with the new HDMI is newly defined.

When the one-bit flag information "New Rx Sink" exists in the EDID read from the sink device 120, the control unit 113 determines that the sink device 120 is compliant with the new HDMI. That is, when the sink device 120 is compliant with the current HDMI, the one-bit flag information "New Rx Sink" does not exist in the EDID read from the sink device 120.

"Second Determination Method"

The control unit 113 communicates with the sink device 120 via the cable 200 to determine whether the sink device 120 is compliant with the new HDMI. For example, the control unit 113 confirms whether the sink device 120 is compliant with the new HDMI with a command base by using the CEC line.

Also, for example, the control unit 113 communicates with the sink device 120 by using the bidirectional communication path (HEAC function) including the utility line and the HPD line to determine whether the sink device 120 is compliant with the new HDMI. In addition, for example, the control unit 113 confirms whether the sink device 120 is compliant with the new HDMI by using an unused line such as a utility line and receiving/transmitting some signals until the transmission becomes available.

"Determination Whether Cable is Compliant with New HDMI"

Next, a method for determining by the control unit 113 whether the cable 200 is compliant with the new HDMI is described. As the determination method, various methods can be considered as disclosed in Japanese Patent Application Laid-Open No. 2012-250673. One example is described below.

Figure 16:
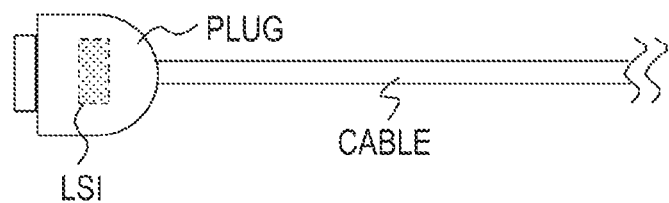
FIG. 16 is a diagram to describe a method for determining whether the cable in the control unit is compliant with the new HDMI.

In a case of this example, as illustrated in FIG. 16, the new HDMI cable includes a large scale integration (LSI), for example, in the plug. For example, in a state where +5 V is supplied from the source device 110, the sink device 120 requires an output to the LSI by a CEC protocol while the HPD is lowered to L. Note that the sink device 120 in this case is a sink device being compliant with the new HDMI. The LSI reports a register value mounted in the LSI (indicating that the LSI is compliant with the new HDMI and cable characteristics data such as a transmittable data band) to the sink device 120 with the CEC protocol in response to the output request from the sink device 120.

The sink device 120 adds the information reported from the LSI to the EDID. After the addition, the sink device 120 instructs the source device 110 to read the EDID by changing the HPD to H. The control unit 113 determines whether the cable 200 is compliant with the new HDMI on the basis of the EDID read from the sink device 120. That is, when the information indicating that the cable 200 is compliant with the new HDMI is included in the EDID, the control unit 113 determines that the cable 200 is compliant with the new HDMI.

Note that the sink device 120 requests the LSI to output by the CEC protocol in the above description. However, it can be also considered that the source device 110 requests the LSI to output by the CEC protocol and directly receives the report of the register value (indicating that the LSI is compliant with the new HDMI and cable characteristics data such as a transmittable data band) from the LSI.

As described above, in the AV system 10 illustrated in FIG. 1, the data transmitting unit 112 of the source device 110 has the operation mode of the new HDMI mode in addition to the operation mode of the current HDMI. Here, the number of the differential signal channels to transfer the digital signal such as video data is three in the current HDMI and six in the new HDMI. Therefore, signal transmission with a high data rate can be performed by using the new HDMI. Also, when the sink device 120 and the cable 200 are not compliant with the new HDMI, a backward compatibility is secured by using the current HDMI (traditional HDMI).

Also, in the AV system 10 illustrated in FIG. 1, TMDS coding is employed as coding for the TMDS channels #0 to #2 in the new HDMI mode. Therefore, it is preferable that the source device 110 perform the TMDS coding as the TMDS channels #0 to #2. Reduction in a design load can be expected, and in addition, coding with less unnecessary radiation can be employed.

<2. Variation>

Note that the number of the differential signal channels to transmit the digital signal such as the video data in the current HDMI is three, and the number of differential signal channels is six in the new HDMI, in the above embodiment. However, the number of the differential signal channels to transmit the digital signal such as the video data is not limited to six and may be four, five, or seven. For example, it is assumed that the number of the differential signal channels to transmit the digital signal such as the video data be five and a clock frequency be increased to about 1.2 times. This enables to obtain a data transfer speed equivalent to that in a case of the six differential signal channels.

Also, in the above embodiment, the present technology is applied to the AV system in which the source device and the sink device are connected by an HDMI standard digital interface. The present technology can be similarly applied to an AV system which is connected by other similar digital interfaces.

Also, the technology may have a following configuration.

(1) A transmission apparatus including:
a digital signal transmission unit configured to transmit a digital signal to which coding has been performed to an external device by a differential signal through a plurality of channels via a transmission path, wherein
the digital signal transmission unit transmits a digital signal to which first coding has been performed and from which clock extraction is not available through a part of the plurality of channels and transmits a digital signal to which second coding has been performed and from which clock extraction is available through the other channels of the plurality of channels.

(2) The transmission apparatus according to (1), wherein the first coding is TMDS coding.

(3) The transmission apparatus according to (1) or (2), wherein
both the first coding and the second coding are 8 bit/10 bit conversion coding.

(4) The transmission apparatus according to any one of (1) to (3), wherein
the transmission path is an HDMI cable, and
the number of a part of the channels is three, and the number of other channels is three.

(5) A transmission method including:
a digital signal transmission step of transmitting a digital signal to which coding has been performed to an external device by a digital signal transmission unit by using a differential signal through a plurality of channels via a transmission path, wherein
in the digital signal transmission step, a digital signal to which first coding has been performed and from which clock extraction is not available is transmitted through a part of the plurality of channels, and a digital signal to which second coding has been performed and from which clock extraction is available is transmitted through the other channels of the plurality of channels.

(6) A reception apparatus including:
a digital signal reception unit configured to receive a digital signal to which coding has been performed from an external device by a differential signal through a plurality of channels via a transmission path, wherein
the digital signal reception unit receives a digital signal to which first coding has been performed and from which clock extraction is not available through a part of the plurality of channels and receives a digital signal to which second coding has been performed and from which clock extraction is available through other channels of the plurality of channels, and
the reception apparatus further including:
a processing unit configured to process the digital signal received through the plurality of channels on the basis of the clock extracted from the digital signal received through any one of the other channels.

(7) A reception method including:
a digital signal receiving step of receiving a digital signal to which coding has been performed from an external device by a digital signal reception unit by a differential signal through a plurality of channels via a transmission path, wherein
in the digital signal receiving step, a digital signal to which first coding has been performed and from which clock extraction is not available is received through a part of the plurality of channels, and a digital signal to which second coding has been performed and from which clock extraction is available is received through the other channels of the plurality of channels, and
the reception method further including:
a processing step of processing the digital signal received through the plurality of channels on the basis of the clock extracted from the digital signal received through any one of the other channels.

(8) A transmission apparatus including:
a digital signal transmission unit configured to transmit a digital signal to which coding has been performed to an external device by a differential signal through a plurality of channels via a transmission path, wherein
the digital signal transmission unit transmits the digital signal by selecting one of a first mode and a second mode,
the first mode is a mode for transmitting a digital signal to which first coding has been performed and from which clock extraction is not available through a predetermined number of first channels and transmitting a digital signal to which second coding has been performed and from which clock extraction is available through a predetermined number of second channels, and
the second mode is a mode for transmitting the digital signal to which the first coding has been performed through the predetermined number of first channels and transmitting a clock through a single third channel corresponding to any one of the predetermined number of second channels.

(9) The transmission apparatus according to (8), further including:
a mode determining unit configured to determine whether the external device and the transmission path are compliant with the first mode; and
a control unit configured to control mode selection by the digital signal transmission unit on the basis of the determination by the mode determining unit.

(10) The transmission apparatus according to (8) or (9), wherein
channels of the predetermined number of second channels other than the single channel corresponding to the third channel are AC coupled with the transmission path.

(11) The transmission apparatus according to any one of (8) to (10), wherein
the first coding is TMDS coding.

(12) The transmission apparatus according to any one of (8) to (11), wherein
both the first coding and the second coding are 8 bit/10 bit conversion coding.

(13) The transmission apparatus according to any one of (8) to (12), wherein
the transmission path is an HDMI cable, and
the number of the first channels is three, and the number of the second channels is three.

(14) A transmission method including:
a digital signal transmission step of transmitting a digital signal to which coding has been performed to an external device by a digital signal transmission unit by a differential signal through a plurality of channels via a transmission path, wherein in the digital signal transmission step, the digital signal is transmitted by selecting one of a first mode and a second mode, the first mode is a mode for transmitting a digital signal to which first coding has been performed and from which clock extraction is not available through a predetermined number of first channels and transmitting a digital signal to which second coding has been performed and from which clock extraction is available through a predetermined number of second channels, and the second mode is a mode for transmitting a digital signal to which the first coding has been performed through the predetermined number of first channels and transmitting a clock through a single third channel corresponding to any one of the predetermined number of second channels.

(15) A reception apparatus including:

a digital signal reception unit configured to receive a digital signal to which coding has been performed from an external device by a differential signal through a plurality of channels via a transmission path, wherein the digital signal reception unit receives the digital signal by selecting one of a first mode and a second mode, the first mode is a mode for receiving a digital signal to which first coding has been performed and from which clock extraction is not available through a predetermined of number of first channels and receiving a digital signal to which second coding has been performed and from which clock extraction is available through a predetermined number of second channels, and the second mode is a mode for receiving a digital signal to which the first coding has been performed through the predetermined number of first channels and receiving a clock through a single third channel corresponding to any one of the predetermined number of second channels, and the reception apparatus further including:

a processing unit configured to process the digital signal received through the predetermined number of first channels and second channels on the basis of the clock extracted from the digital signal received through any one of the predetermined number of second channels in the first mode and process the digital signal received through the predetermined number of first channels on the basis of the clock received through the third channel in the second mode.

(16) The reception apparatus according to (15), wherein channels of the predetermined number of second channels other than the single channel corresponding to the third channel are AC coupled with the transmission path.

(17) The reception apparatus according to (15) or (16), wherein both the first coding and the second coding are 8 bit/10 bit conversion coding.

(18) The reception apparatus according to any one of (15) to (17), wherein the transmission path is an HDMI cable, and the number of the first channels is three, and the number of the second channels is three.

(19) The reception apparatus according to any one of (15) to (18), further including:

a control unit configured to control mode selection by the digital signal transmission unit on the basis of control information transmitted from the external device.

(20) A reception method including:

a digital signal receiving step of receiving a digital signal to which coding has been performed from an external device by a digital signal reception unit by a differential signal through a plurality of channels via a transmission path, wherein in the digital signal receiving step, the digital signal is received by selecting one of a first mode and a second mode, the first mode is a mode for receiving a digital signal to which first coding has been performed and from which clock extraction is not available through a predetermined number of first channels and receiving a digital signal to which second coding has been performed and from which clock extraction is available through a predetermined number of second channels, and the second mode is a mode for receiving a digital signal to which the first coding has been performed through the predetermined number of first channels and receiving a clock through a single third channel corresponding to any one of the predetermined number of second channels, and the reception method further including:

a processing step of processing the digital signal received through the predetermined number of first channels and second channels on the basis of the clock extracted from the digital signal received through any one of the predetermined number of second channels in the first mode and processing the digital signal received through the predetermined number of first channels on the basis of the clock received through the third channel in the second mode.

REFERENCE SIGNS LIST 11 mapper
12 TMDS encoder
13, 14, 17 changeover switch
15 8B10B encoder
16 multiplier
21 TMDS decoder
22, 23, 24, 28 changeover switch
25 8B10B decoder
26 clock extractor
27 divider
29 demapper
81 HDMI transmitter
82 HDMI receiver
100 AV system
110 source device
111 receptacle
112 data transmitting unit
113 control unit
120 sink device
121 receptacle
122 data receiving unit
123 control unit
200 cable
201, 202 plug.

The invention claimed is:

1. A transmission apparatus, comprising:
a transmitter configured to transmit:
a first digital signal to an external device, wherein
the first digital signal corresponds to a first coding technique,
clock extraction from the first digital signal is unavailable,
the first digital signal is transmitted as a first differential signal through a first part of a plurality of channels of a transmission path,
the transmission path is a high definition multimedia interface (HDMI) cable,
a first number of the first part of the plurality of channels is three, and
a second number of a second part of the plurality of channels is three; and a second digital signal to the external device, wherein
the second digital signal corresponds to a second coding technique,
the clock extraction is available from the second digital signal,
the second digital signal is transmitted as a second differential signal through the second part of the plurality of channels other than the first part of the plurality of channels,
the first coding technique is different from the second coding technique, and
each of the first coding technique and the second coding technique is a 8-bit data to 10-bit data conversion coding technique.

2. The transmission apparatus according to claim 1, wherein the first coding technique is a transition-minimized differential signaling (TMDS) coding technique.

3. A transmission method, comprising:
transmitting a first digital signal to an external device, wherein
the first digital signal corresponds to a first coding technique,
clock extraction from the first digital signal is unavailable,
the first digital signal is transmitted as a first differential signal through a first part of a plurality of channels of a transmission path,
the transmission path is a high definition multimedia interface (HDMI) cable,
a first number of the first part of the plurality of channels is three, and
a second number of a second part of the plurality of channels is three; and transmitting a second digital signal to the external device, wherein
the second digital signal corresponds to a second coding technique,
the clock extraction from the second digital signal is available,
the second digital signal is transmitted as a second differential signal through the second part of the plurality of channels other than the first part of the plurality of channels,
the first coding technique is different from the second coding technique, and
each of the first coding technique and the second coding technique is 8-bit data to 10-bit data conversion coding technique.

4. A transmission apparatus, comprising:
a transmitter configured to transmit each of a first digital signal and a second digital signal as a differential signal through a plurality of channels of a transmission path to an external device, based on selection of one of a first mode or a second mode, wherein
the first mode corresponds to transmission of:
the first digital signal, corresponding to a first coding technique, through a specific number of first channels of the plurality of channels, wherein clock extraction from the first digital signal is unavailable, and
the second digital signal, corresponding to a second coding technique, through a specific number of second channels of the plurality of channels, wherein
the clock extraction from the second digital signal is available, and
the first coding technique is different from the second coding technique, and
the second mode corresponds to transmission of:
the first digital signal through the specific number of first channels, and
a clock through a third channel corresponding to one of the specific number of second channels,
channels of the specific number of second channels other than the third channel are AC coupled with the transmission path, and
each of the first coding technique and the second coding technique is 8-bit data to 10-bit data conversion coding technique.

5. The transmission apparatus according to claim 4, further comprising at least one processor configured to:
determine whether the external device and the transmission path are compliant with the first mode; and
control the selection of one of the first mode or the second mode by the transmitter based on the determination.

6. The transmission apparatus according to claim 4, wherein the first coding technique is a transition-minimized differential signaling (TMDS) coding technique.

7. The transmission apparatus according to claim 4, wherein
the transmission path is a high definition multimedia interface (HDMI) cable,
the specific number of first channels is three, and
the specific number of second channels is three.

8. A transmission method, comprising:
transmitting each of a first digital signal and a second digital signal as a differential signal through a plurality of channels of a transmission path to an external device, based on selection of one of a first mode or a second mode, wherein
the first mode corresponds to transmission of:
the first digital signal, corresponding to a first coding technique, through a specific number of first channels of the plurality of channels, wherein clock extraction from the first digital signal is unavailable, and
the second digital signal, corresponding to a second coding technique, through a specific number of second channels of the plurality of channels, wherein
the clock extraction from the second digital signal is available, and
the first coding technique is different from the second coding technique, and
the second mode corresponds to transmission of:
the first digital signal through the specific number of first channels, and
a clock through a third channel corresponding to one of the specific number of second channels,
channels of the specific number of second channels other than the third channel are AC coupled with the transmission path, and
each of the first coding technique and the second coding technique is 8-bit data to 10-bit data conversion coding technique.

9. A transmission apparatus, comprising:
a transmitter configured to transmit:
a first digital signal to an external device, wherein
the first digital signal corresponds to a first coding technique,
clock extraction from the first digital signal is unavailable,
the first digital signal is transmitted as a first differential signal through a first part of a plurality of channels of a transmission path, the transmission path is a high definition multimedia interface (HDMI) cable,
a first number of the first part of the plurality of channels is three, and
a second number of a second part of the plurality of channels is three; and
a second digital signal to the external device, wherein
the second digital signal corresponds to a second coding technique,
the clock extraction from the second digital signal is available,
the second digital signal is transmitted as a second differential signal through the second part of the plurality of channels other than the first part of the plurality of channels,
the first coding technique is a Transition-minimized differential signaling (TMDS) coding technique, and
each of the first coding technique and the second coding technique is 8-bit data to 10-bit data conversion coding technique.

10. A transmission apparatus, comprising:
a transmitter configured to transmit each of a first digital signal and a second digital signal as a differential signal through a plurality of channels of a transmission path to an external device, based on selection of one of a first mode or a second mode, wherein
the first mode corresponds to transmission of:
the first digital signal, corresponding to a first coding technique, through a specific number of first channels of the plurality of channels, wherein clock extraction from the first digital signal is unavailable, and
the second digital signal, corresponding to a second coding technique, through a specific number of second channels of the plurality of channels, wherein
the clock extraction from the second digital signal is available, and
the first coding technique is different from the second coding technique, and
the second mode corresponds to transmission of:
the first digital signal through the specific number of first channels, and
a clock through a third channel corresponding to one of the specific number of second channels, and
each of the first coding technique and the second coding technique is 8-bit data to 10-bit data conversion coding technique; and
at least one processor configured to:
determine whether the external device and the transmission path are compliant with the first mode; and
control the selection of one of the first mode or the second mode by the transmitter based on the determination.

11. A transmission apparatus, comprising:
a transmitter configured to transmit:
a first digital signal to an external device, wherein
the first digital signal corresponds to a first coding technique,
clock extraction from the first digital signal is unavailable, and
the first digital signal is transmitted as a first differential signal through a first part of a plurality of channels of a transmission path; and
a second digital signal to the external device, wherein
the second digital signal corresponds to a second coding technique,
the clock extraction is available from the second digital signal,
the second digital signal is transmitted as a second differential signal through a second part of the plurality of channels other than the first part of the plurality of channels,
the first coding technique is different from the second coding technique, and
each of the first coding technique and the second coding technique is a 8-bit data to 10-bit data conversion coding technique.

12. A transmission method, comprising:
transmitting a first digital signal to an external device, wherein
the first digital signal corresponds to a first coding technique,
clock extraction from the first digital signal is unavailable, and
the first digital signal is transmitted as a first differential signal through a first part of a plurality of channels of a transmission path; and
transmitting a second digital signal to the external device, wherein
the second digital signal corresponds to a second coding technique,
the clock extraction from the second digital signal is available,
the second digital signal is transmitted as a second differential signal through a second part of the plurality of channels other than the first part of the plurality of channels,
the first coding technique is different from the second coding technique, and
each of the first coding technique and the second coding technique is 8-bit data to 10-bit data conversion coding technique.

13. A transmission apparatus, comprising:
a transmitter configured to transmit:
a first digital signal to an external device, wherein
the first digital signal corresponds to a first coding technique,
clock extraction from the first digital signal is unavailable, and
the first digital signal is transmitted as a first differential signal through a first part of a plurality of channels of a transmission path; and
a second digital signal to the external device, wherein
the second digital signal corresponds to a second coding technique,
the clock extraction from the second digital signal is available, and
the second digital signal is transmitted as a second differential signal through a second part of the plurality of channels other than the first part of the plurality of channels,
the first coding technique is a Transition-minimized differential signaling (TMDS) coding technique, and
each of the first coding technique and the second coding technique is a 8-bit data to 10-bit data conversion coding technique.

14. A transmission method, comprising:
transmitting each of a first digital signal and a second digital signal as a differential signal through a plurality of channels of a transmission path to an external device, based on selection of one of a first mode or a second mode, wherein the first mode corresponds to transmission of:
  the first digital signal, corresponding to a first coding technique, through a specific number of first channels of the plurality of channels, wherein clock extraction from the first digital signal is unavailable, and
  the second digital signal, corresponding to a second coding technique, through a specific number of second channels of the plurality of channels, wherein
    the clock extraction from the second digital signal is available, and
    the first coding technique is different from the second coding technique, and
the second mode corresponds to transmission of:
  the first digital signal through the specific number of first channels, and
  a clock through a third channel corresponding to one of the specific number of second channels;
determining whether the external device and the transmission path are compliant with the first mode; and
controlling the selection of one of the first mode or the second mode based on the determination, wherein
  each of the first coding technique and the second coding technique is 8-bit data to 10-bit data conversion coding technique.

15. A transmission apparatus, comprising:
a transmitter configured to transmit each of a first digital signal and a second digital signal as a differential signal through a plurality of channels of a transmission path to an external device, based on selection of one of a first mode or a second mode, wherein
the first mode corresponds to transmission of:
  the first digital signal, corresponding to a first coding technique, through a specific number of first channels of the plurality of channels, wherein clock extraction from the first digital signal is unavailable, and
  the second digital signal, corresponding to a second coding technique, through a specific number of second channels of the plurality of channels, wherein
    the clock extraction from the second digital signal is available, and
    the first coding technique is different from the second coding technique, and
the second mode corresponds to transmission of:
  the first digital signal through the specific number of first channels, and
  a clock through a third channel corresponding to one of the specific number of second channels, and
each of the first coding technique and the second coding technique is 8-bit data to 10-bit data conversion coding technique.

16. A transmission apparatus, comprising:
a transmitter configured to transmit each of a first digital signal and a second digital signal as a differential signal through a plurality of channels of a transmission path to an external device, based on selection of one of a first mode or a second mode, wherein
the first mode corresponds to transmission of:
  the first digital signal, corresponding to a first coding technique, through a specific number of first channels of the plurality of channels, wherein clock extraction from the first digital signal is unavailable, and
  the second digital signal, corresponding to a second coding technique, through a specific number of second channels of the plurality of channels, wherein
    the clock extraction from the second digital signal is available, and
    the first coding technique is different from the second coding technique,
the second mode corresponds to transmission of:
  the first digital signal through the specific number of first channels, and
  a clock through a third channel corresponding to one of the specific number of second channels,
the transmission path is a high definition multimedia interface (HDMI) cable,
the specific number of first channels is three,
the specific number of second channels is three, and
  each of the first coding technique and the second coding technique is 8-bit data to 10-bit data conversion coding technique.

17. A transmission method, comprising:
transmitting each of a first digital signal and a second digital signal as a differential signal through a plurality of channels of a transmission path to an external device, based on selection of one of a first mode or a second mode, wherein
the first mode corresponds to transmission of:
  the first digital signal, corresponding to a first coding technique, through a specific number of first channels of the plurality of channels, wherein clock extraction from the first digital signal is unavailable, and
  the second digital signal, corresponding to a second coding technique, through a specific number of second channels of the plurality of channels, wherein
    the clock extraction from the second digital signal is available, and
    the first coding technique is different from the second coding technique,
the second mode corresponds to transmission of:
  the first digital signal through the specific number of first channels, and
  a clock through a third channel corresponding to one of the specific number of second channels, and
each of the first coding technique and the second coding technique is 8-bit data to 10-bit data conversion coding technique.

18. A transmission method, comprising:
transmitting each of a first digital signal and a second digital signal as a differential signal through a plurality of channels of a transmission path to an external device, based on selection of one of a first mode or a second mode, wherein
the first mode corresponds to transmission of:
  the first digital signal, corresponding to a first coding technique, through a specific number of first channels of the plurality of channels, wherein clock extraction from the first digital signal is unavailable, and
  the second digital signal, corresponding to a second coding technique, through a specific number of second channels of the plurality of channels, wherein
    the clock extraction from the second digital signal is available, and
    the first coding technique is different from the second coding technique,
the second mode corresponds to transmission of:

the first digital signal through the specific number of first channels, and
a clock through a third channel corresponding to one of the specific number of second channels,
the transmission path is a high definition multimedia interface (HDMI) cable,
the specific number of first channels is three,
the specific number of second channels is three, and
each of the first coding technique and the second coding technique is 8-bit data to 10-bit data conversion coding technique.

\* \* \* \* \*